US011337368B2

(12) United States Patent
Alliss

(10) Patent No.: US 11,337,368 B2
(45) Date of Patent: May 24, 2022

(54) SPOOL FOR STRAIGHT THROUGH LINE FEED VEGETATION TRIMMER APPARATUS WITH MODULES AND SPOKES

(71) Applicant: George E. Alliss, Fairmont, NC (US)

(72) Inventor: George E. Alliss, Fairmont, NC (US)

( * ) Notice: Subject to any disclaimer, the term of this patent is extended or adjusted under 35 U.S.C. 154(b) by 0 days.

(21) Appl. No.: 15/881,252

(22) Filed: Jan. 26, 2018

(65) Prior Publication Data
US 2018/0168098 A1 Jun. 21, 2018

Related U.S. Application Data

(63) Continuation of application No. 15/376,474, filed on Dec. 12, 2016, now Pat. No. 9,924,631, which is a continuation-in-part of application No. 14/548,392, filed on Nov. 20, 2014, now Pat. No. 9,516,807, which is a continuation-in-part of application No. 12/428,453, filed on Apr. 22, 2009, now Pat. No. 8,910,387.

(60) Provisional application No. 61/907,883, filed on Nov. 22, 2013, provisional application No. 61/071,321, filed on Apr. 22, 2008.

(51) Int. Cl.
*A01D 34/416* (2006.01)

(52) U.S. Cl.
CPC ..... *A01D 34/4161* (2013.01); *A01D 34/4163* (2013.01); *A01D 34/4166* (2013.01); *Y10T 29/49826* (2015.01); *Y10T 29/49838* (2015.01)

(58) Field of Classification Search
CPC ............ A01D 34/4161; A01D 34/4163; A01D 34/4166; Y10T 29/4926; Y10T 29/49838

USPC .......................................................... 30/276
See application file for complete search history.

(56) References Cited

U.S. PATENT DOCUMENTS

| | | | |
|---|---|---|---|
| 2,429,675 A * | 10/1947 | Eypper | H02G 11/02 |
| | | | 242/388.1 |
| 4,086,700 A | 5/1978 | Inada | |
| 4,203,212 A | 5/1980 | Proulx | |
| 4,259,782 A | 4/1981 | Proulx | |
| 4,566,189 A | 1/1986 | Muto | |
| 4,633,588 A | 1/1987 | Pittinger, Jr. | |

(Continued)

FOREIGN PATENT DOCUMENTS

| WO | 2007032043 A1 | 3/2007 |
|---|---|---|
| WO | 2013138752 | 9/2013 |

(Continued)

*Primary Examiner* — Omar Flores Sanchez
(74) *Attorney, Agent, or Firm* — David W. Carstens; James H. Ortega; Carstens & Cahoon, LLP

(57) ABSTRACT

A trimmer head for use with either clockwise or counter-clockwise trimmer heads, including the use of a bidirectionally dispensing spool. Various locations of passages straight through the trimmer head and spool are shown along with various locations of components of the ratcheting mechanism to allow for winding of the trimmer line on the trimmer head and for limiting the amount of line dispensed during "bumping" of the trimmer head knob on the ground. Additionally, an extended funnel into the passage can be provided to facilitate entrance of trimmer line into the funnel even when the line is not perfectly straight. Also, spokes can be used in place of the flanges of the spool to save material and cost, while still providing a guide and barrier between the line store areas.

23 Claims, 37 Drawing Sheets

(56) References Cited

U.S. PATENT DOCUMENTS

| | | |
|---|---|---|
| 4,672,798 A | 6/1987 | Ota |
| 5,020,223 A | 6/1991 | Desent et al. |
| 5,060,384 A | 10/1991 | Everts |
| 5,109,607 A | 5/1992 | Everts |
| 5,461,787 A | 10/1995 | Araki et al. |
| 5,657,542 A | 8/1997 | White, III et al. |
| 5,659,960 A | 8/1997 | Everts et al. |
| 5,765,287 A | 6/1998 | Griffini et al. |
| 5,806,192 A | 9/1998 | Everts et al. |
| 5,881,464 A | 3/1999 | Collins et al. |
| 6,035,618 A | 3/2000 | Fogle |
| 6,148,523 A | 11/2000 | Everts et al. |
| 6,263,580 B1 | 7/2001 | Stark et al. |
| 6,314,848 B2 | 11/2001 | Morabit et al. |
| 6,457,242 B1 | 10/2002 | Fogle |
| 6,581,292 B2 | 6/2003 | Allis |
| 6,901,667 B2 | 6/2005 | Proulx |
| 6,952,877 B2 | 10/2005 | Pfaltzgraff |
| 7,017,272 B2 | 3/2006 | Grace |
| 7,275,324 B2 | 10/2007 | Proulx |
| 7,412,768 B2 | 8/2008 | Alliss |
| 7,536,792 B2 | 5/2009 | Moore |
| D598,255 S | 8/2009 | Alliss |
| 7,581,322 B2 | 9/2009 | Proulx |
| 7,607,232 B2 | 10/2009 | Pfaltzgraff |
| 7,640,668 B2 | 1/2010 | Iacona |
| 7,797,839 B2 | 9/2010 | Proulx |
| 7,882,642 B2 | 2/2011 | Proulx |
| 7,979,991 B2 | 7/2011 | Pfaltzgraff |
| 8,025,249 B2 | 9/2011 | Alliss |
| 8,266,805 B1 | 9/2012 | Alliss |
| 8,307,558 B2 | 11/2012 | Alliss |
| 8,745,879 B2 | 6/2014 | Alliss |
| 8,863,395 B2 | 10/2014 | Alliss |
| 8,910,387 B2 | 12/2014 | Alliss |
| 9,253,942 B2 | 2/2016 | Alliss |
| 9,380,743 B2 | 7/2016 | Alliss |
| 2002/0073556 A1 | 6/2002 | Fogle |
| 2004/0103543 A1 | 6/2004 | Fogle |
| 2006/0254060 A1 | 11/2006 | Alliss |
| 2006/0254061 A1 | 11/2006 | Alliss |
| 2008/0053052 A1 | 3/2008 | Cigarini |
| 2009/0100686 A1 | 4/2009 | Sing et al. |
| 2009/0260237 A1 | 10/2009 | Alliss |
| 2011/0000091 A1 | 1/2011 | Proulx |
| 2011/0239468 A1 | 10/2011 | Conlon |
| 2011/0302793 A1 | 12/2011 | Alliss |
| 2012/0000079 A1 | 1/2012 | Arnetoli |
| 2012/0066913 A1 | 3/2012 | Alliss |
| 2013/0133208 A1 | 5/2013 | Skinner |
| 2017/0354089 A1* | 12/2017 | Kullberg ................ A01D 34/90 |
| 2018/0132417 A1* | 5/2018 | Alliss ................. A01D 34/4161 |
| 2020/0296888 A1* | 9/2020 | Arnetoli ............ A01D 34/4166 |

FOREIGN PATENT DOCUMENTS

| | | |
|---|---|---|
| WO | 2015077393 | 5/2015 |
| WO | 2015144197 A1 | 10/2015 |

* cited by examiner

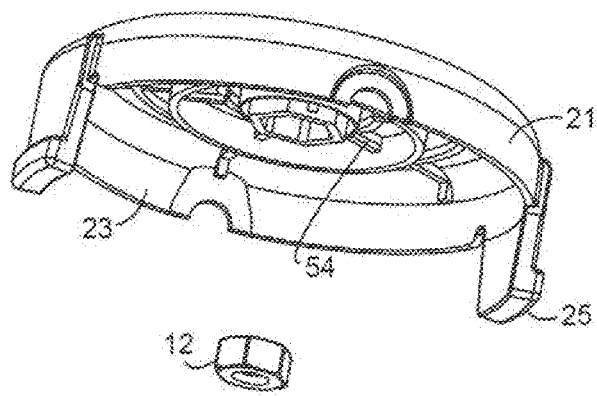
Fig. 4
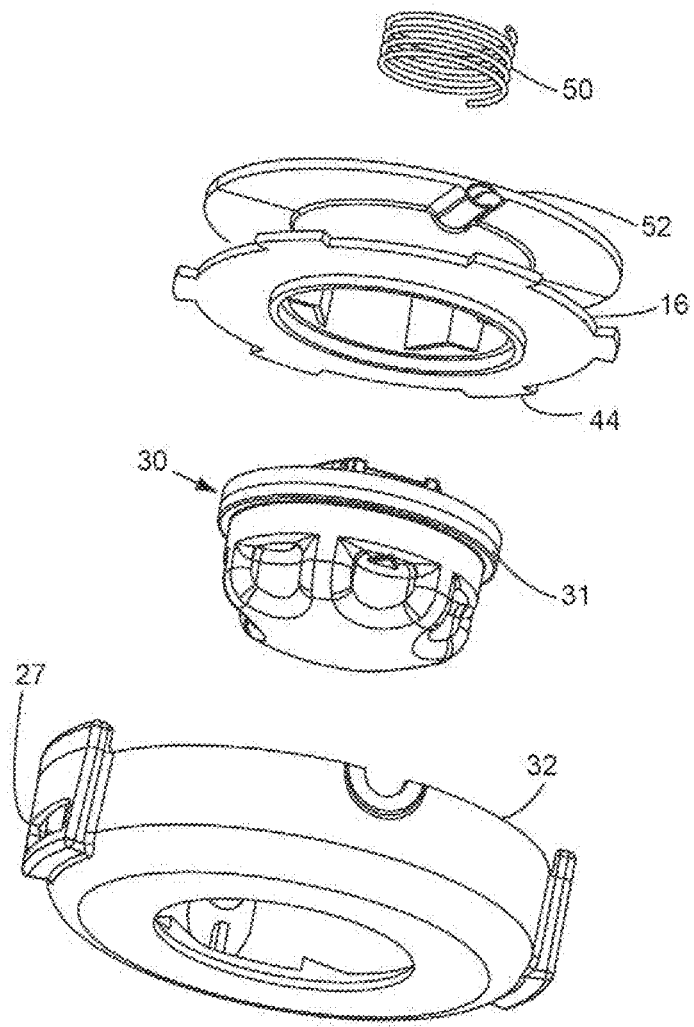

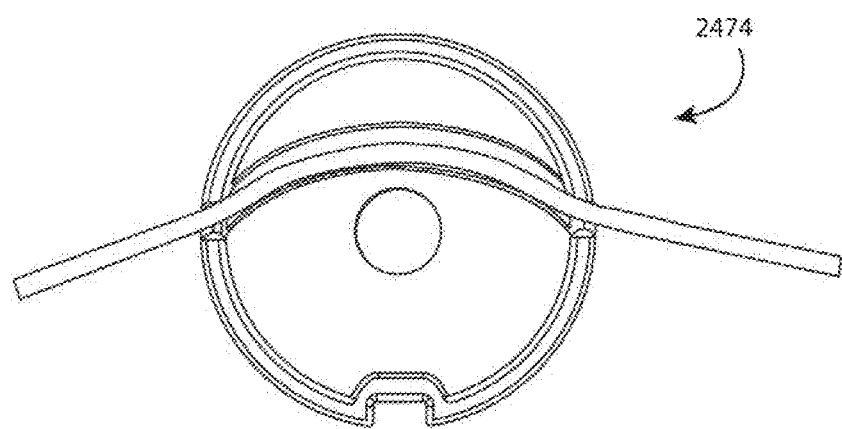
FIG 25C
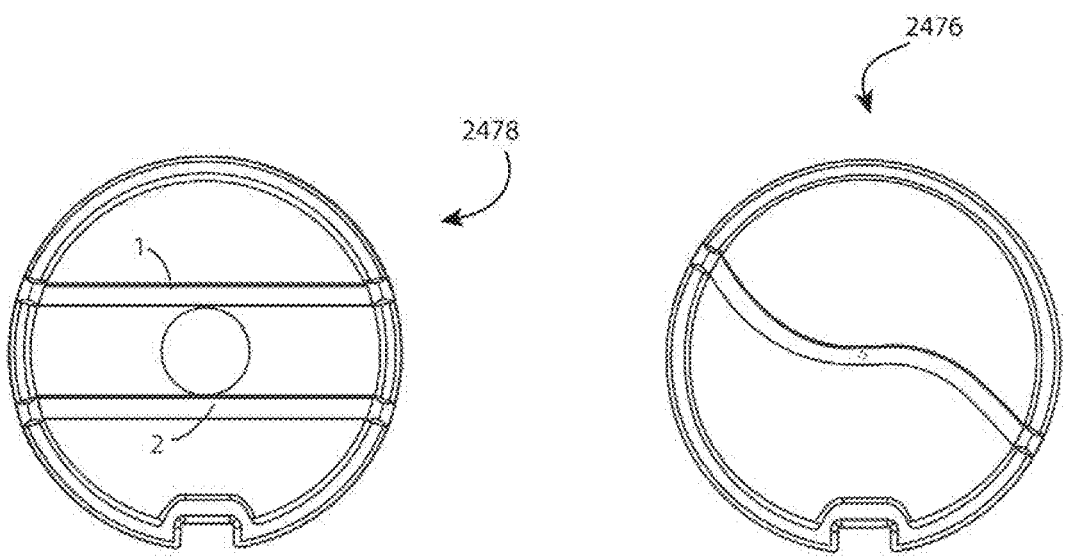
FIG 25E
FIG 25D

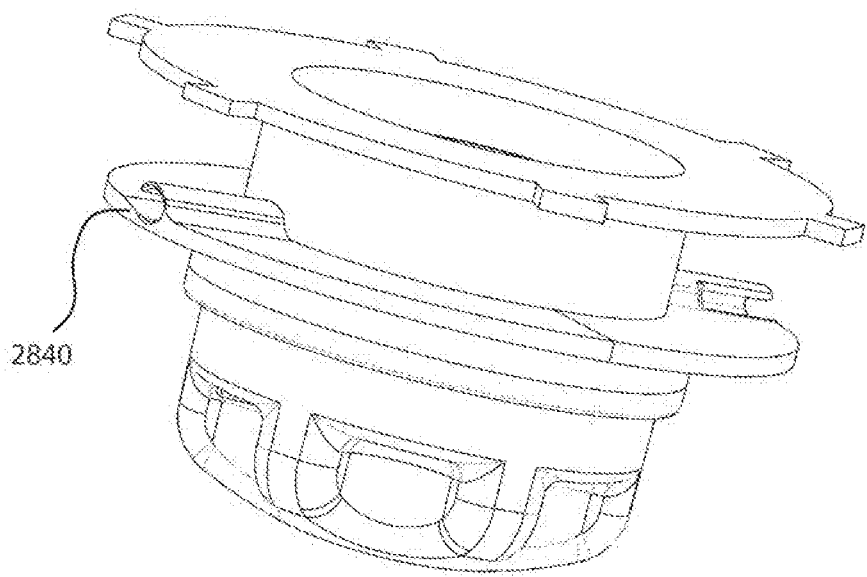
FIG. 28A
FIG. 28B
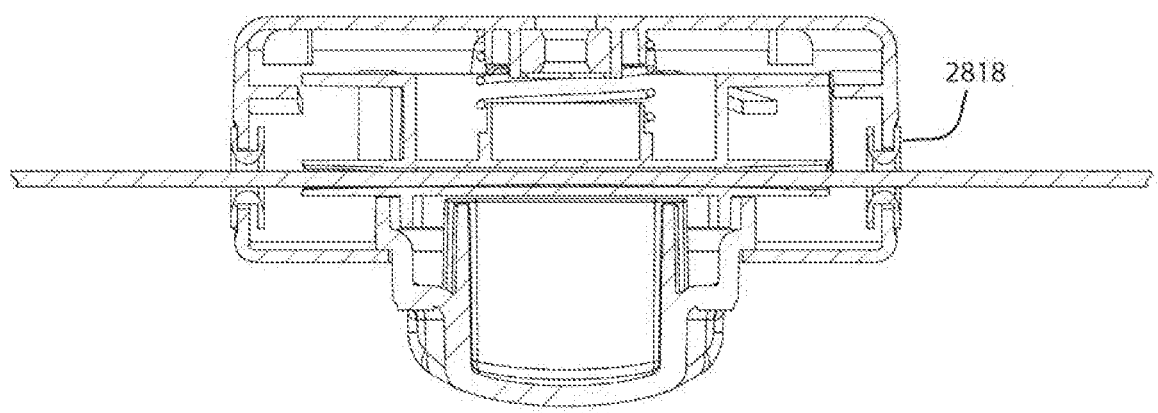

SPOOL FOR STRAIGHT THROUGH LINE FEED VEGETATION TRIMMER APPARATUS WITH MODULES AND SPOKES

CROSS REFERENCE TO RELATED APPLICATIONS

This application is a Continuation of U.S. patent application Ser. No. 15/376,474 filed Dec. 12, 2016, which is a Continuation-in-part of U.S. patent application Ser. No. 14/548,392, filed Nov. 20, 2014, now U.S. Pat. No. 9,516,807 which claims the benefit of U.S. Provisional Application 61/907,883, filed Nov. 22, 2013; the entire specifications of which are incorporated herein by reference. U.S. patent application Ser. No. 14/548,392 is also a Continuation-in-part of U.S. patent application Ser. No. 12/428,453, filed Apr. 22, 2009, now U.S. Pat. No. 8,910,387 which claims the benefit of U.S. Provisional Application 61/071,321, filed Apr. 22, 2008; the entire specifications of which are incorporated herein by reference.

BACKGROUND OF THE INVENTION

1. Field of the Invention

In general, the present invention relates to string trimmers and the rotating heads of string trimmers. More particularly, the present invention relates to the mechanisms contained within string trimmer heads for winding, holding and dispensing new lengths of trimmer line when needed.

2. Prior Art Description

String trimmer machines have been commercially sold for over a quarter of a century. In this period of time, there have been many variations to the design of the string trimmer machine and especially to the trimmer head.

The trimmer head is the part of the string trimmer machine that is rotated by the drive shaft of the trimmer machine. The trimmer head holds lengths of trimmer line that rotate with the trimmer head. The rotating trimmer line contacts and cuts vegetation as it spins.

Depending upon the make, model, and manufacturer of the string trimmer machine, the trimmer head rotates either clockwise or counterclockwise during operation. The trimmer head is affixed to the string trimmer machine by a bolt or nut to the terminus of the drive shaft of the string trimmer including any extension thereto. Threading direction of the bolt or nut is determined by the rotation direction of the drive shaft so that the trimmer head does not unthread from the string trimmer during operation. The mix in the current retail market is roughly evenly split between clockwise and counterclockwise rotating string trimmer machines.

There are many types of trimmer heads on the market. The most common types of traditional trimmer heads are the bump-feed trimmer head and the automatic-feed trimmer head. Both types of trimmer heads contain an internal spool that holds a reserve of wound trimmer line. As the trimmer line wears away, it can be replaced from the internal spool. In a bump-feed trimmer head, short lengths of line are released from the spool when the bottom of the trimmer head is impacted or "bumped" against a hard surface. In an automatic-feed trimmer head, a short length of line is released from the spool without the operator having to manually strike or bump the bottom of the trimmer head on the ground. Many mechanisms exist in the prior art for controlling the release of wound trimmer line from the internal spool of a trimmer head. Bump-activated trimmer heads are exemplified by U.S. Pat. No. 5,881,464 to Collins, entitled Line Head for Flexible Line Trimmer. Automatic-feed trimmer heads are exemplified by U.S. Pat. No. 5,060,384 to Everts, entitled Automatic Head for a Line Trimmer; U.S. Pat. No. 5,109,607 to Everts, entitled Automatic Line Trimmer Head; and U.S. Pat. No. 4,566,189 to Muto, entitled Filament Type Trimmer Apparatus Cutters.

The primary problem associated with such traditional trimmer heads is one of reloading. In order to replenish and reload new trimmer line into the trimmer head, the trimmer head must typically be disassembled and the internal spool removed. This process is often too difficult for many homeowners to complete successfully or even attempt.

Another common problem that often accompanies bump-feed trimmer heads is the problem of line twisting string on the spool. Most bump-feed trimmer heads contain two lengths of trimmer line that extend from opposite side of the trimmer head. Bump-feed trimmer heads rely upon centrifugal forces to pull the trimmer lines from the spool. If the trimmer lines tangle, twist or become buried under subsequent windings or fuse together from heat, the trimmer lines may not dispense in the proper manner. The trimmer head must then be disassembled, the trimmer string unwound and again rewound in the proper manner before the trimmer head will again work as designed. Furthermore, whenever the trimmer string supply is exhausted, the trimmer head must be manually disassembled. The spool is removed and rewound with a new supply of trimmer line. The spool is then reassembled back into the trimmer head. This process is difficult, labor intensive and highly time consuming.

Another problem associated with traditional automatic-feed trimmer heads is the complexity and reliability of the release mechanism that draws trimmer line from the spool when needed. As many homeowners will attest, the mechanism for releasing the trimmer line is usually the first part of a string trimmer machine that fails to work.

Yet another disadvantage of some prior art trimmer heads is that they are designed to rotate in only a single direction, that is, the trimmer head is designed only to be mounted on a clockwise trimmer or on a counterclockwise trimmer but not both. Accordingly, a trimmer head designed for a clockwise trimmer may not work on a counterclockwise trimmer. Furthermore, some parts from a clockwise trimmer head cannot be interchanged with any of the parts from a counterclockwise trimmer head. This requires a trimmer head manufacturer to create two sets of manufacturing tools, one for clockwise trimmer heads and one for counterclockwise trimmer heads. This significantly increases the cost associated with manufacturing trimmer heads. Furthermore, it results in each trimmer head design having two different models, one for clockwise rotation, and one for counterclockwise rotation.

A need therefore exists for a string trimmer head that has an inexpensive yet reliable mechanism for dispensing trimmer line when needed. A need also exists for a string trimmer head that dispenses trimmer line with less likelihood that the trimmer line will tangle, twist, or bind. Furthermore, a need exists for a trimmer head that does not have to be disassembled to have new string added. Lastly, a need exists for a trimmer head that can be manufactured inexpensively with few operating parts and can operate either as a uni-directional of bi-directional trimmer head on trimmer machines. These needs are met by the present invention as described and claimed below.

SUMMARY OF THE INVENTION

The present invention is to a trimmer head assembly and the method of configuring the trimmer head assembly. The trimmer head assembly attaches to a string trimmer machine. The trimmer head assembly holds lengths of trimmer line that cut vegetation when the trimmer head assembly spins and contacts the vegetation.

The trimmer head assembly has a housing that attaches to the string trimmer machine. A spool is provided inside the housing. The spool rotates about an axis of rotation. The spool can move longitudinally along the axis of rotation between at least a first position and a second position. A ratcheting mechanism and an indexing mechanism are provided between the trimmer head housing and the spool. When the spool is in its first position, the ratcheting mechanism enables the spool to continuously or discretely rotate about the axis of rotation in the direction opposite that in which the trimmer head assembly spins. The ratcheting mechanism also prevents the spool from rotating within the housing in the either direction when unintended and only allows rotation in the trimmer line winding direction when sufficient torque is applied.

Using the ratcheting mechanism, new trimmer line can be wound onto the spool, simply by anchoring the trimmer line to the spool and manually turning the spool. No disassembly is required. Preferably the string/line can be fed straight through from one eyelet to the other eyelet ("straight through") prior to winding the line onto the trimmer core.

In operation, an activation mechanism is provided for momentarily moving the spool from its first position in the housing to its second position. The activation mechanism can be automatic or bump activated. Once momentarily in its second position, the indexing mechanism enables the spool to turn so that a small length of the trimmer line can unwind from the spool.

It is an object of the invention to provide improved elements and arrangements thereof in an apparatus for the purposes described which is inexpensive, dependable and fully effective in accomplishing its intended purposes.

For the purposes of this application, a "bidirectionally-operable trimmer head" is defined as a trimmer head that can be assembled with the line (subsequently or previously) wound around the trimmer head spool and mounted to either a clockwise trimmer machine or to a counterclockwise trimmer machine, wherein the trimmer head will dispense line outward when activated regardless of whether the trimmer head is currently rotating in the clockwise or counterclockwise direction because the spool can rotate in a direction independent of the trimmer head to dispense a length of line outwardly. In a bump-activated trimmer head, the centrifugal force on the line overcomes the rotational forces on the spool to allow it to rotate in the direction to release an amount of trimmer line even if the spool rotation direction is opposite to the current trimmer head rotation direction during line dispensing and the spool rotational velocity is faster than the trimmer head rotational velocity when both are rotating in the same direction. A "wound trimmer head" is defined as a trimmer head having a trimmer line wound on the spool thereof.

It is an object of the invention to provide a bidirectionally-operable trimmer head for mounting the same assembled, wound trimmer head for use with either a clockwise or counterclockwise trimmer head.

These and other objects of the present invention will be readily apparent upon review of the following detailed description of the invention and the accompanying drawings. These objects of the present invention are not exhaustive and are not to be construed as limiting the scope of the claimed invention. Further, it must be understood that no one embodiment of the present invention need include all of the aforementioned objects of the present invention. Rather, a given embodiment may include one or none of the aforementioned objects. Accordingly, these objects are not to be used to limit the scope of the claims of the present invention.

BRIEF DESCRIPTION OF THE DRAWINGS

FIG. 4 is an exploded view of the trimmer head of FIG. 1.

FIG. 25A-E shows alternate modules having various passageways through the center of the spool for use with at least one embodiment of the invention.

FIGS. 28A&B show an alternative spool arrangement having passages through the bottom flange for use with at least one embodiment of the invention.

FIGS. 35-38 show an embodiment of a spool for a trimmer head having an extended funnel. FIG. 35 is a perspective view.

FIG. 36 is a cross-sectional view.

FIGS. 37-38 are environmental views.

Similar reference characters denote corresponding features consistently throughout the attached drawings.

DETAILED DESCRIPTION OF THE DRAWINGS

Figure 1:
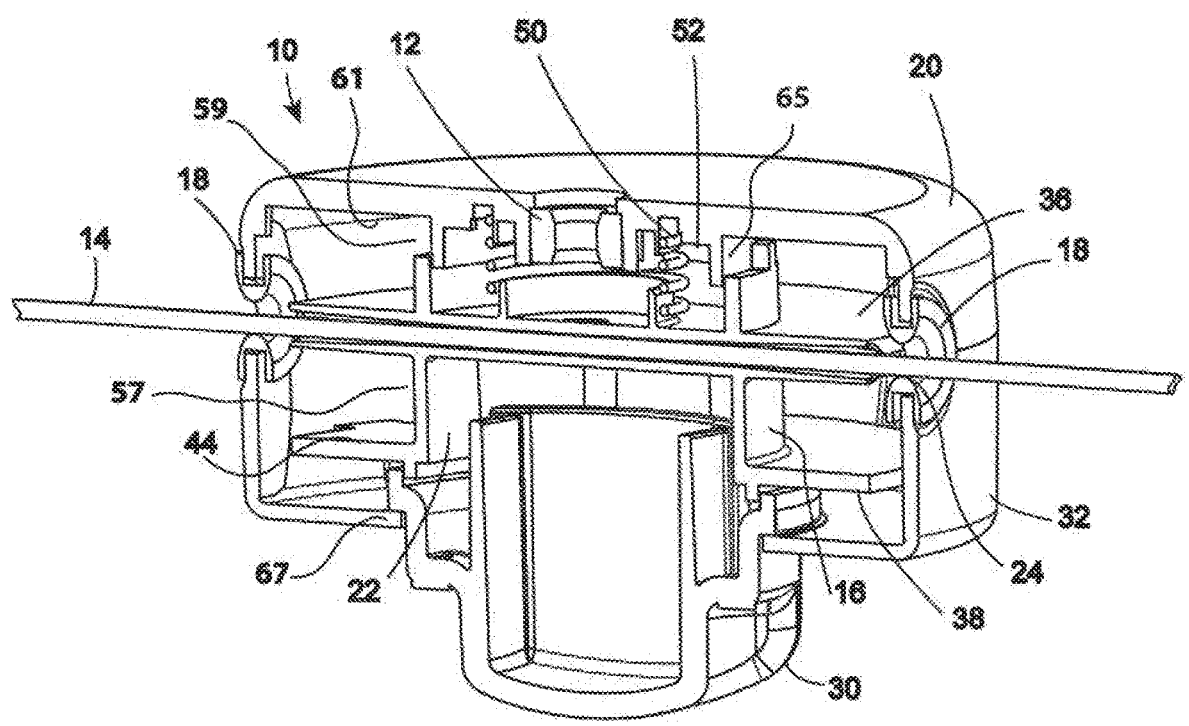
FIG. 1 is a cross-sectional view of a trimmer head according to a first embodiment of the invention.

The present invention relates to straight through feed trimmer heads for string line trimmers.

FIGS. 1-4 shows a sectional view of a first embodiment of a trimmer head 10 for use with a string trimmer machine (not shown). The trimmer head affixes to a string trimmer machine drive shaft arbor (including any extension thereof) (not shown) by a bolt, nut or other fastener 12 in a form and specification as required to mate with the respective arbor. Typically, the direction of threading of the fastener is selected so that during normal rotation of the drive shaft, the fastener will tend to tighten rather than loosen from the arbor. The fastener 12 allows the trimmer head 10 to rotate as a unit with the drive shaft to drive a trimmer head line 14 in a radius outwardly from the trimmer head. The trimmer head line 14 is well known in the art and may be made of plastic or other material and is rotated at a high speed to cut grass, weeds or brush that the line comes in contact with and is available in a number of line diameters. U.S. Pat. No. 8,025,249 issued Sep. 27, 2011 to George Alliss shows one such configuration and operation of a string trimmer head, which patent is incorporated herein by reference.

The upper housing 21 includes a non-circular "keyed" chamber 23 (FIG. 4) for receiving (or acting as) the fastener 12 and to prevent the fastener from rotating relative to the housing. The chamber 23 is shown as being octagonal, but the shape may be chosen to accommodate whatever fastener is used to connect the housing to the arbor. The fastener is typical a bolt or nut is forward or reverse threading.

A core 16 is provided within the trimmer head 10 to receive the trimmer line thereabout as it is wound into the trimmer head. The core is selectively rotatable relative to the housing. A pair of eyelets 18 are provided on the outer housing 20 to introduce the trimmer line into the interior of the housing. The eyelets are preferably 180 degrees apart from each other, but in some circumstances may be more or less than 180 degrees apart and may include fewer or more eyelets. The eyelets may include a metal guard or other sleeve for resisting wear as the line 14 within the eyelet is moved about or through the eyelet.

The core preferably may have a central opening or chamber defined by inner wall(s) 22. Preferably the trimmer core 16 preferably includes a central, straight through guide passage ("channel") 24 therethrough. The passage 24 preferably has a first opening selectively alignable with (or being positioning relative to) one of the pair of eyelets 18 of the housing to feed a trimmer line therethrough and a second channel opening alignable with the second of the pair of eyelets 18 when the first opening is aligned with the first eyelet. The alignment of the channel and eyelets allows a trimmer line to be fed from the first eyelet through the first channel opening, through the channel and out through the second opening and second eyelet when feeding the trimmer line onto the trimmer head. An indicator 31 (FIG. 4) viewable from outside the trimmer head may be provided so that the user is aware when the core 16 and housing are aligned and ready for receiving the line. In a preferred embodiment, the indicator is on the knob viewable from beneath the trimmer head.

Figure 2:
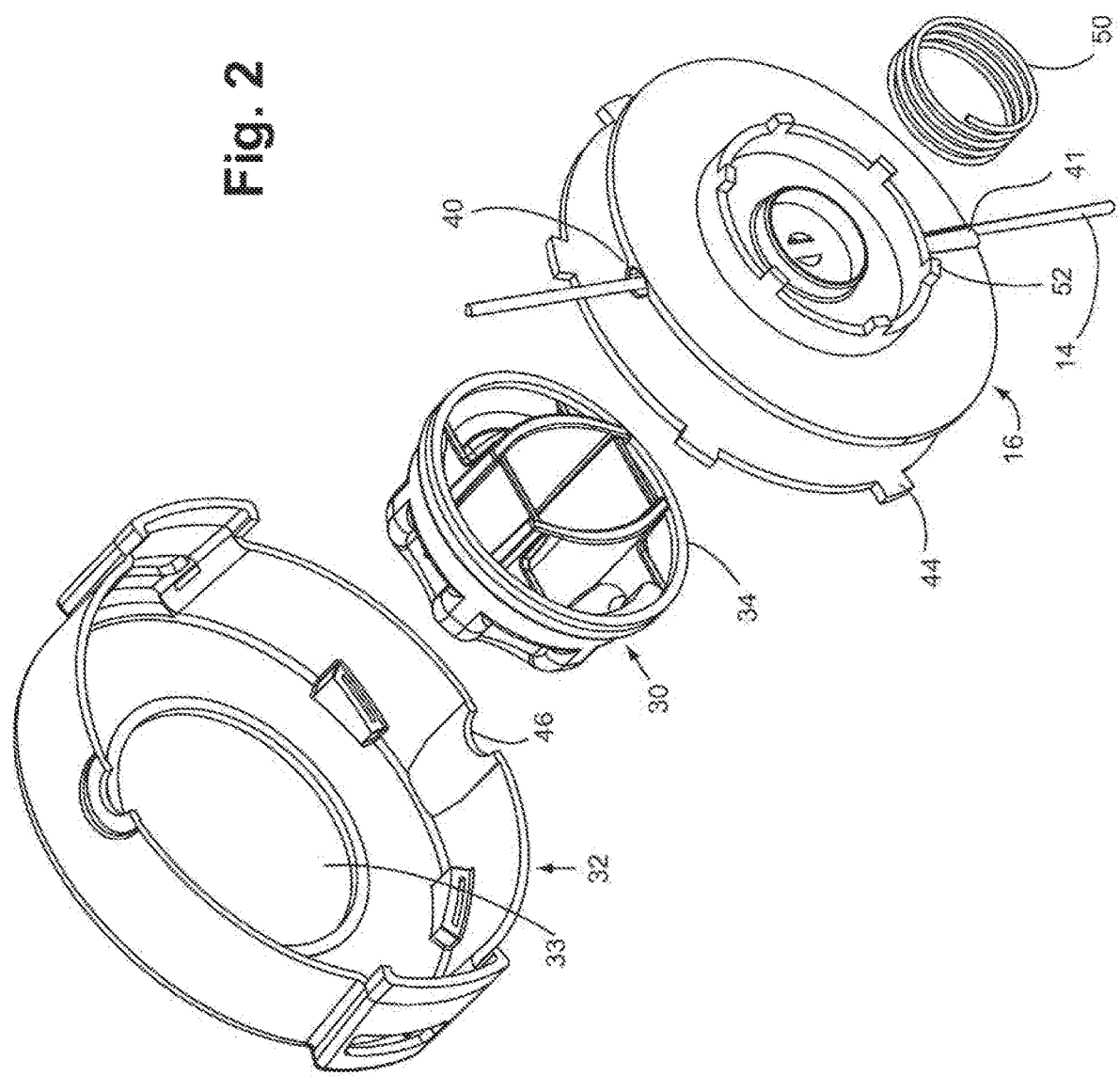
FIG. 2 is an exploded view of several of the components of the trimmer head of FIG. 1.

FIG. 2 shows a preferred configuration of the core of the trimmer head. In order to wind and release trimmer line from the trimmer head, a ratchet system and an indexing system are provided. The ratchet system includes a first system for winding the trimmer line. The figure shows the trimmer head core 16 with a trimmer line 14 fed therethrough. A knob 30 for engaging and rotating the core 16 is shown below the core. A lower housing 32 which forms part of the outer housing 20 is shown below the knob. The knob 30 has a number of preferably non-circular arms/splines 34 which are received within a mating receiver of the core 16 to securely rotate the knob and core together when required. The lower housing 32 cooperates with the upper half of the housing 20 to secure the knob and core therein with a portion of the knob 30 extending through an opening 33 in the lower housing. The upper 23 and lower 32 housing may be connected by a number of methods or systems, but are preferably connected by a quick release system such as by flexible arms/fingers 25 and cooperating holes 27 interference fit with each other.

Figure 3:
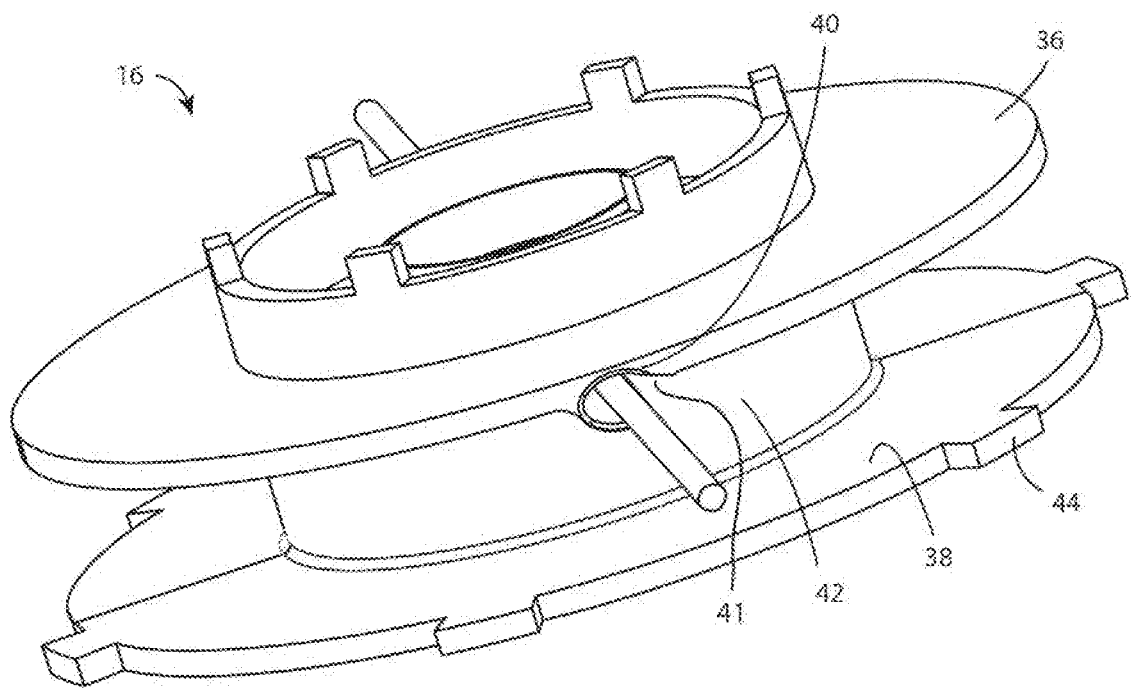
FIG. 3 is a perspective view of the trimmer head spool of FIG. 11.

Additionally, the core and upper and lower housing cooperate to form an indexing system and ratchet mechanism for feeding and controlled release of the trimmer line. In the position shown in FIG. 1, the eyelets 18 and feed channel 24 are aligned allowing a length of trimmer line 14 to feed through the outer housing through the core and out the other side. The knob 30 can be rotated to wind the line onto the core 16. The core has an upper disk 36 and a lower disk 38 which form upper and lower boundaries of the lower chamber 57 for the trimmer line to be wound on the core. The upper chamber 59 is formed by the upper disk 36 and a shelf 61 of the housing as describer later hereinunder. As shown in FIG. 3, the openings 40 of the feed channel 24 have an opening on the side for directing the line onto the core. As the core is rotated clockwise in the FIG. 3, the line will resist turning by friction, inertia and other forces acting on the line outside of the housing 20. The core will turn away from the trimmer line entrance, and the inner wall 42 will begin to pull the trimmer line as the core continues to turn. The line will then begin to be pulled into the housing as the line wraps around the inner wall 42 of core 16. As the user continues to rotate the core via knob 30, cogs 44 on the lower disk 38 will rotate. A number of ramps 46 on the lower housing are arranged to interfere and impede the rotation of the cogs within the housing during normal operation of the string trimmer machine. It should be noted that a spring 50 is provided above the core to bias the core downward but which allows for axial movement of the core (and attached knob) under a preselected force.

One purpose of the obstructions is so that the core cannot "freewheel" when the housing is turned by the string trimmer. It is desired that the core and housing turn together during normal operation so that the trimmer line is maintained at a constant length. If the core were allowed to turn, then the trimmer line could unintentionally wind or unwind as the housing turned relative to the core.

In order to continue to wind the line onto the core, the user applies enough torque on the knob to force the cogs 44 of the core past the ramps 46. The ramps are oriented such that rotation in the proper direction (in the example, clockwise, but one skilled in the art would recognize that the ramps could be arranged to rotate only clockwise, only counterclockwise or in both clockwise and counterclockwise directions by having one ramp or by having two opposing ramps back to back) causes the cog to move up and over the ramp. When turned in the opposite direction (for one way ramp configurations), the cog will strike a vertical wall of the ramp (or other similar obstruction) and further torque will not promote further rotation of the knob and core. As the cog moves up the ramp, the core 16 will move axially upward compressing spring 50. As the cog moves up and over the ramp, the spring will then force the core axially downwardly with the cog axially aligned with the next ramp. This ratcheting system allows the direction of winding to be controlled and also provides a control for allowing only a certain amount of line to be released. One way ratcheting has the advantage of ensuring that the line only winds one way onto the core and the line cannot be "fouled" by turning the core in the "wrong" direction.

The trimmer line during winding will be forced into one of two chambers 57, 59. The side port opening 41 of the passage determines whether the particular end of the line will wrap into the lower chamber 57 or upper chamber 59. As shown in the front of the FIG. 3, the port 41 at the front directs line into the lower chamber 59 which is bound by upper and lower flanges 36,38 (FIG. 3). The rear port 41 (FIG. 2) directs line 14 onto the upper chamber. The upper chamber in this embodiment as best shown in FIG. 2 is bound at the lower end by upper flange 36 and at its upper end by a surface/shelf 61 of the housing 20. Preferably the shelf 61 is smooth to reduce any drag or friction of the trimmer line on the shelf as the spool rotates relative to the housing. The interior wall of the chamber is preferably provided by the core of the flange which rotates about the circular wall 65. Similarly the lower edge of the spool may rotate while being supported for rotation by a lower circular wall 67 of the housing which encloses the spool or both the spool and knob ("activation mechanism").

As is known in the art, the user taps the string trimmer head on the ground to release an amount of string. In the present invention, this is accomplished by depressing the knob further into the housing ("axially upward") causing the core 16 to move upwardly against the bias of the spring 50. The axial movement is sufficient to raise the cogs 44 of the core 16 above the ramps 46. This frees the core 16 to free spin relative to the housing 32 in either direction. The direction of the spin (relative to the housing) will be controlled by the forces on the trimmer line 14 and the direction that the line is wound on the core, not by the direction of the trimmer head. This results in a bidirectionally operable trimmer head that can be mounted to a clockwise or counter clockwise trimmer head regardless of the direction the line in wound on the trimmer head. Regardless of whether the trimmer head is spinning clockwise or counterclockwise, the forces on the trimmer line will act to pull the line outward as the centrifugal force on the line pulls the line outwardly. The outward force will act to unwind the line by pulling the line and rotating the core in the proper direction to unwind the line. Since the cogs are temporarily axially upward of the ramps 46, the core is free to spin in either direction (relative to the housing) and will move in the proper direction to unwind the line regardless of the direction of rotation of the trimmer head.

Another function of the trimmer head is to control the amount of rotation during the free spin when feeding line outward. This is desirable so that only a small bit of line is fed out to replace line that has been worn down or cut during trimming of brush or weeds. The user can repeat the process described by "bumping" the knob again if further amounts of line are needed. The line control indexing feature in the embodiment illustrated is performed by a number of upward protrusions 52 ("square teeth") provided on the upper area of the core. The amount of string/line 14 released during one bump is controlled by the spacing between stop bars 54 on the upper section 21 of housing 20. The core 16 may rotate in the free spin mode at most until the protrusions hit one of the stop bars halting the rotation of the core. As soon as the pressure on the knob is released the core will drop back down to its original axial position under the bias of spring 50. The core may then rotate until a cog 44 runs into an interfering ramp. The centrifugal forces on the line will prevent the cog from further turning up the ramp which would cause the trimmer line to retract onto the spool. A cog turning the opposite direction would strike the vertical wall of the ramp and would thereby be prevented from rotating further. In this way, bumping the knob will allow the core to free spin relative to the housing, but the amount of (bi-directional) free spin will be controlled by the teeth 52 and stop bars and the spring will return the core to the original axial position where the ramps will prevent the core from turning past a ramp by the interaction of the ramps and cogs. It should be noted that even if the teeth do not hit the stops, the bias of the spring will bring the cogs and ramps back into align acting as a failsafe to prevent unintended amounts of line from being released in a single bump.

Bidirectional dispensing. A result of the specific organization of the trimmer head is that once the line is wound on the trimmer head, the trimmer head can dispense line properly no matter which way the trimmer head is rotating. Typically the trimmer line is wound on a trimmer head so that hitting the knob/bump on the ground slows the spool relative to the housing. The housing can thus rotate to unwind the line from the spool as the eyelets contacting the trimmer line unravel a length of line from the spool. The current trimmer head has a separate mode where the spool can also speed up relative to the trimmer head housing to "push" the line outward. In actuality, it is the centrifugal force on the line from the length of the line outside the housing plus the frictional contact of the line with grass or weeds or other material that pulls the line against the spool causing tension in the trimmer line. Trimmer heads built in accordance with at least one aspect of the present invention allow the spool to "free wheel" relative to the housing for a brief interval. During this interval the line can actually pull the spool faster than the housing to release an amount of line. Preferably, one of the stops prevents an undue amount of line from being released at the time. This ability to release the line by being able to both speed up relative to the housing or to slow down relative to the housing during dispensing of the line outwardly from the spool to allow the spool to dispense trimmer line independent of the direction of rotation of the trimmer head is defined for the purposes of this application as "bidirectional dispensing" or "bidirectional line dispensing." A trimmer head that is capable of bidirectional dispensing is "bidirectionally operable." The direction of winding of the line on the trimmer head is defined herein as the direction in the line would be wound relative to the spool to release/dispense trimmer line when the spool slows relative to the trimmer housing, i.e., winding a trimmer line clockwise on the spool would allow a counterclockwise rotating trimmer head to dispense line from the spool when the knob is "bumped" on the ground to slow the spool relative to the housing to allow the housing to unwind a length of trimmer line to dispense that length of line outward through the eyelet of the housing as the housing rotates counterclockwise faster relative to the spool.

Figure 5:
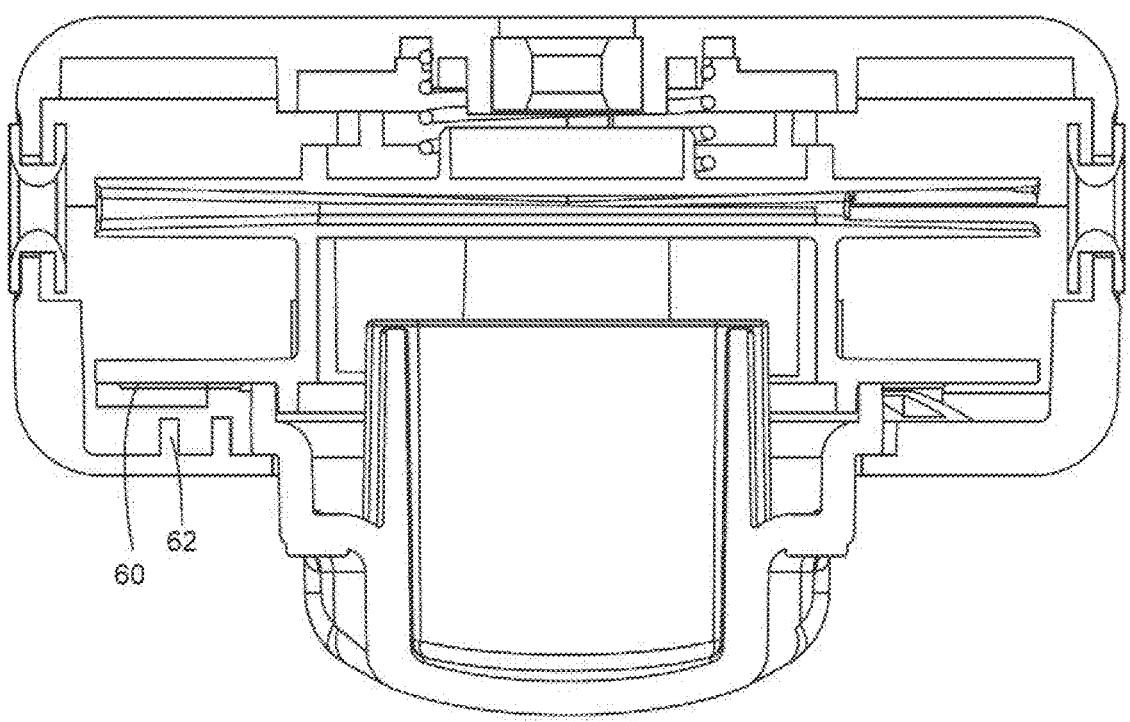
FIG. 5 is a cross-sectional view of an alternative version of the trimmer head of FIG. 1.

FIG. 5 shows an alternative construction for the first embodiment. In this configuration, the ratchet on the bottom of the lower disk 38 are formed by teeth or gears 60 and the ramps 62 on the lower housing 32 have been moved inwardly to accommodate the location of the gears 60. One skilled in the art would recognize from the teachings of the present invention that the functional components of the ratchet (stop bars, teeth/gears, and ramps) could be located on any of the various surfaces of the core as needed to perform the function of providing a winding ratchet and a line feed control function without departing from the scope of the invention.

Figure 24:
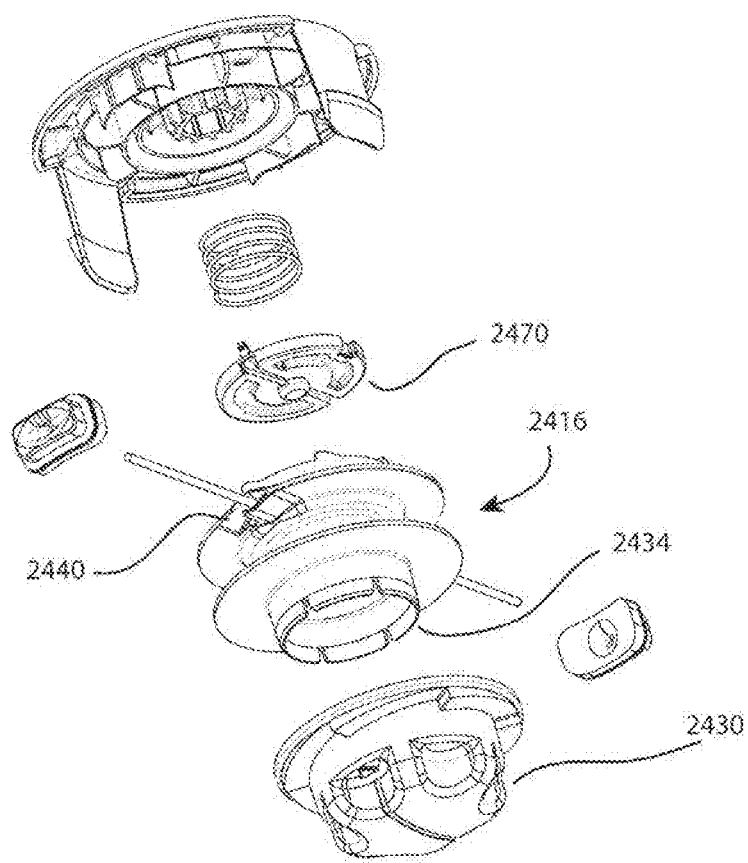
FIG. 24 shows a trimmer head according to a further embodiment of the invention having a modular passage through the center of the spool.
Figure 25A:
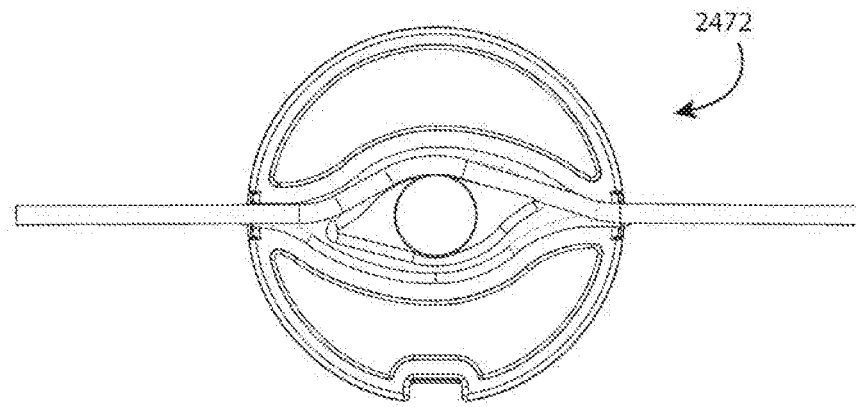
Figure 25B:
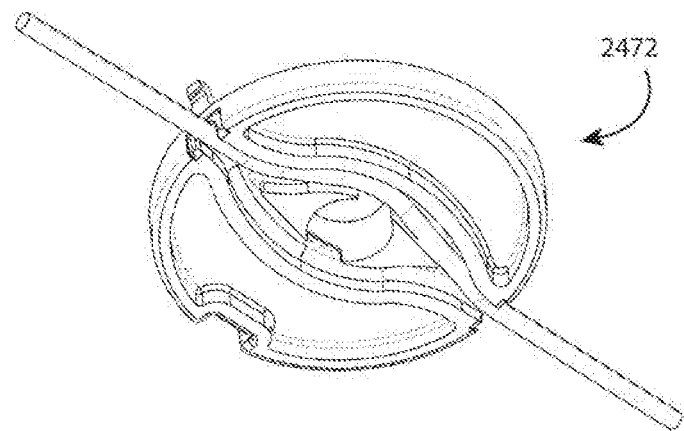
Figure 26A:
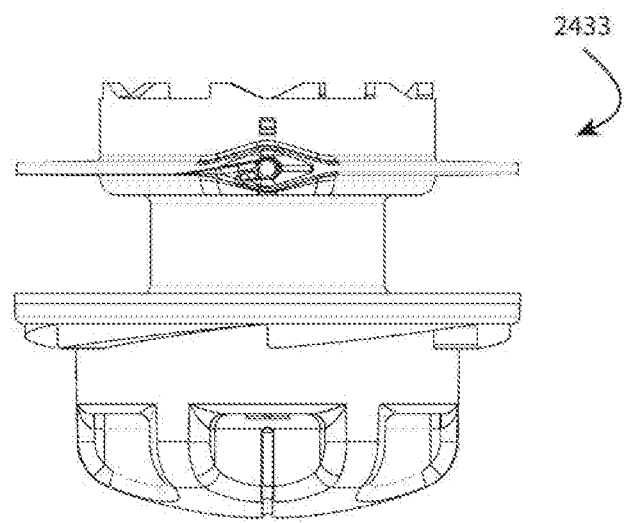
FIGS. 26A&B and FIG. 27 show various components of the trimmer head of FIG. 24.
Figure 26B:
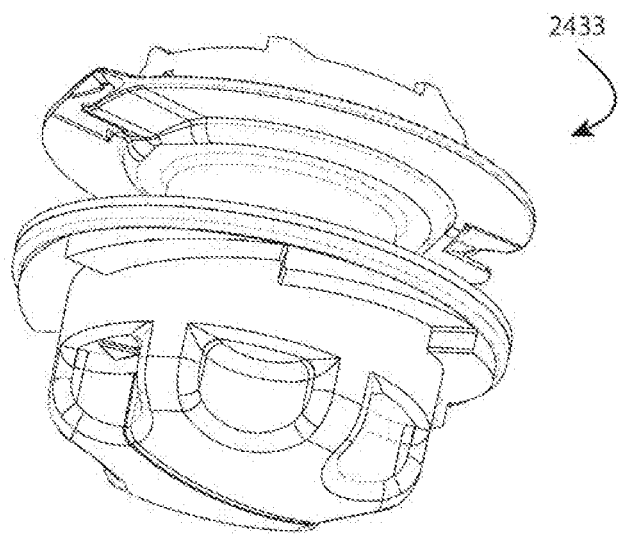
Figure 27:
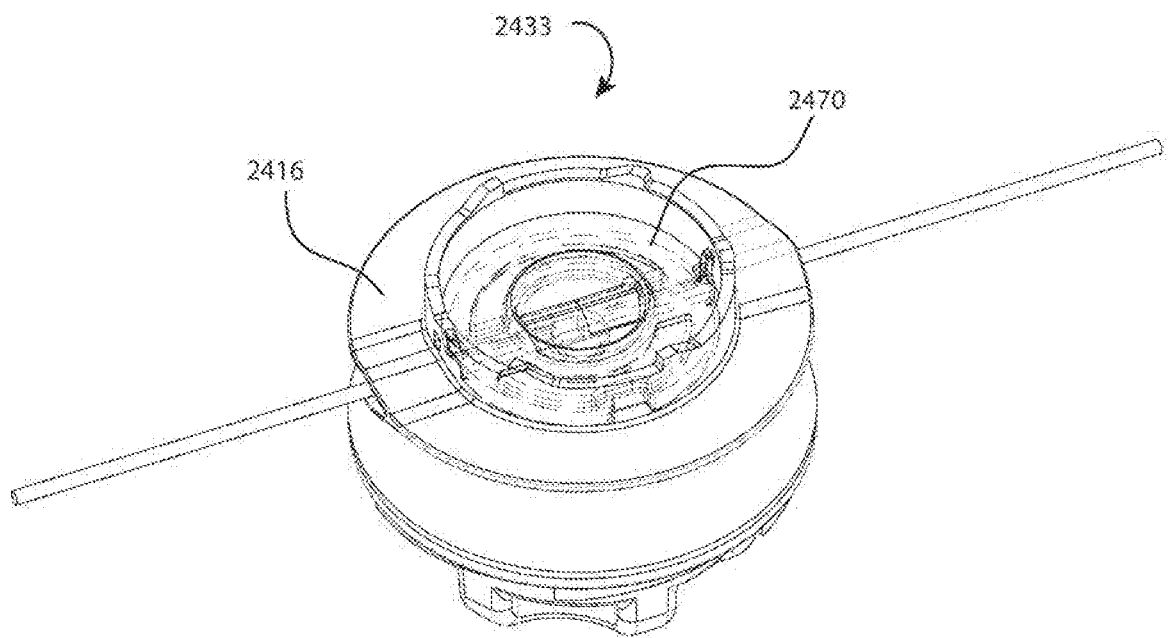

FIG. 24 shows an alternative version of the invention according to a further embodiment. The spool 2416 is splined to knob 2430 through spline 2434 and cooperating slots and grooves on the knob 2430 so that the spool and knob will co-rotate together. FIGS. 26A&B show the combined spool and knob 2433 and profiles of the ramps and cogs thereon. Ramps, stops and cogs are each preferably provided to allow the spool to wind spool in a particular direction and to index the amount of line dispensed can be controlled. A feature shown in FIG. 24 that can be used with any of the other embodiments is a module 2470 that can be installed within the spool 2416. The module aligns with the passages 2440 of the spool and provides/controls routing of the trimmer line within the core of the spool from one flange passageway to the other flange passageway. The module may have a key, tooth, spline, groove or other device so that it is aligned properly with the spool. The module may be reversible or rotatable to change the orientation, path or alignment of the module with the spool. The module is preferably switchable with other modules to control the path through the core to route the line in various paths. The module provides flexibility such as routing around a driveshaft, bolt or other similar device (if any) by providing a curved path 2472 (FIGS. 25A&B) or to route straight though the center 2470 (FIG. 24). Depending on the shape of the path through the flange (or wing), additional paths could also be used. FIG. 25C shows a one-sided curved path 2474 that leads through a corresponding spool flange (not shown). FIG. 25D shows a spiral path through the center of the module 2476 that leads to a corresponding spool flange having spiral, non-radial passages therethrough (not shown). FIG. 25E shows a module 2478 having a plurality of passage for use selectively with 1-2 trimmer lines through a cooperating flange having corresponding passages (not shown) for each of the two module channels. FIG. 27 shows a module 2470 installed within the spool 2416.

FIGS. 28A&B show an embodiment of the invention similar to that of FIG. 1, however the channels 2840 are provided in a lower flange instead of the upper flange 40. One skilled in the art would appreciate that the eyelets 2818 of the housing would have to be aligned with the lower flange in this embodiment instead of with the upper flange. Preferably the cogs 2844 are also reversed from the bottom flange to the top flange.

Figure 6:
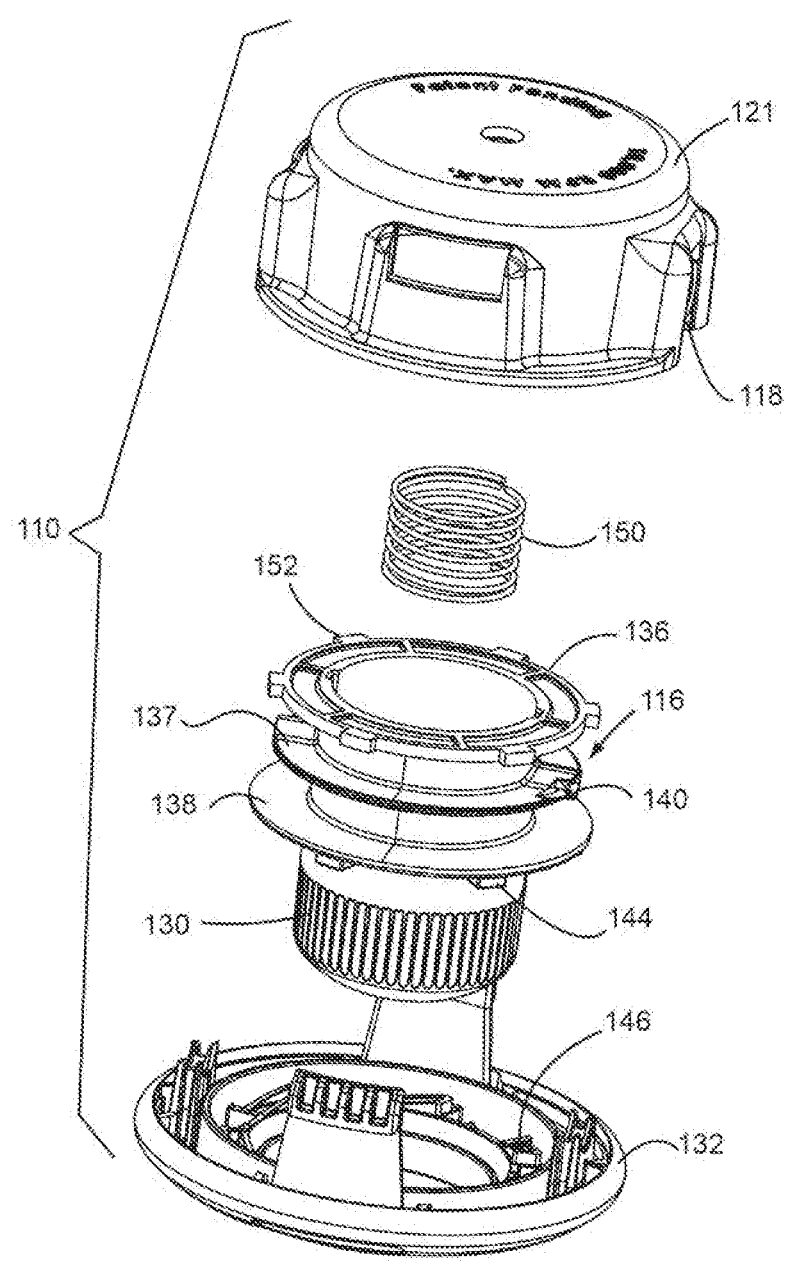
FIGS. 6-8 show views of a trimmer head according to a third embodiment of the invention having a center flange.
Figure 7:
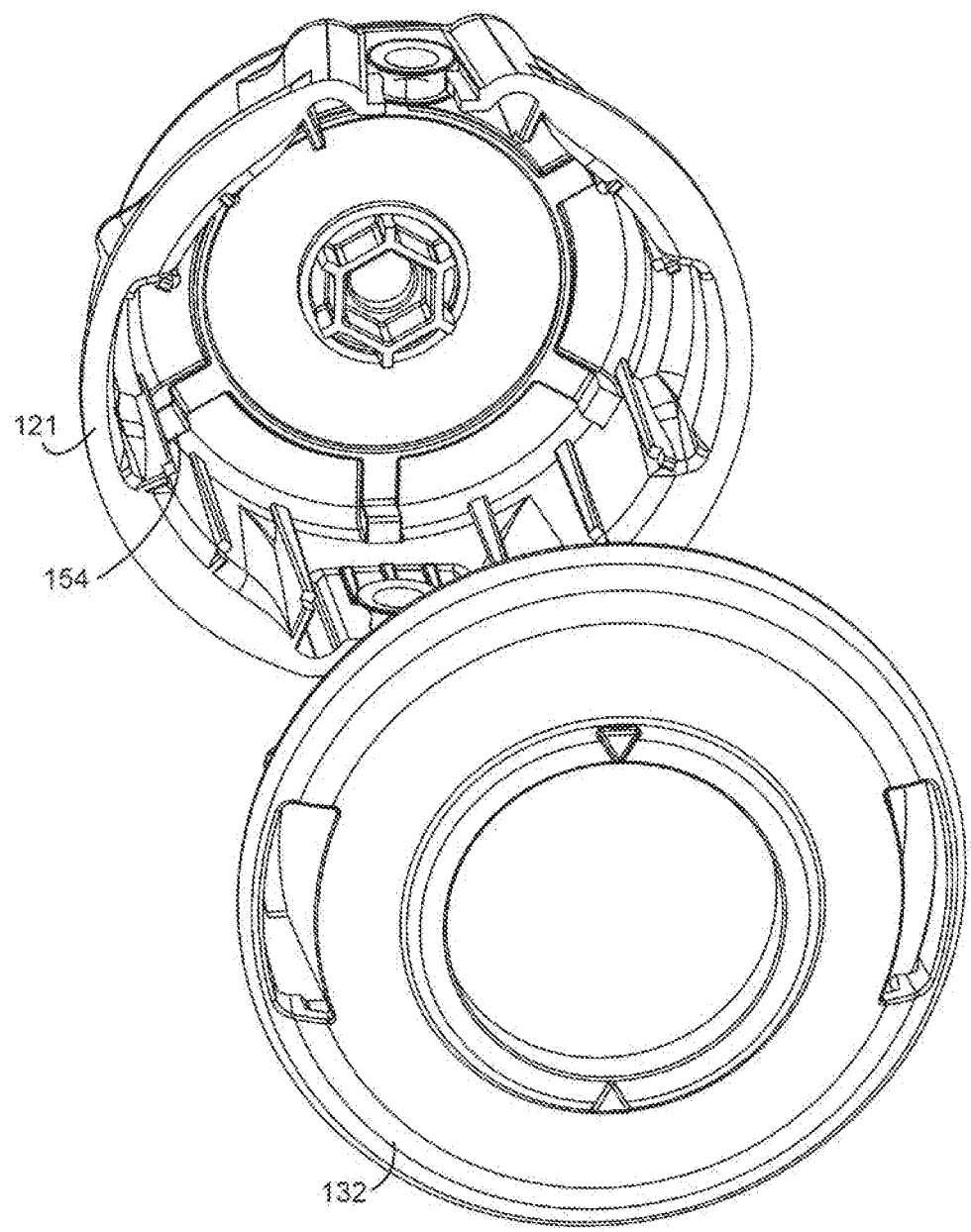
Figure 8:
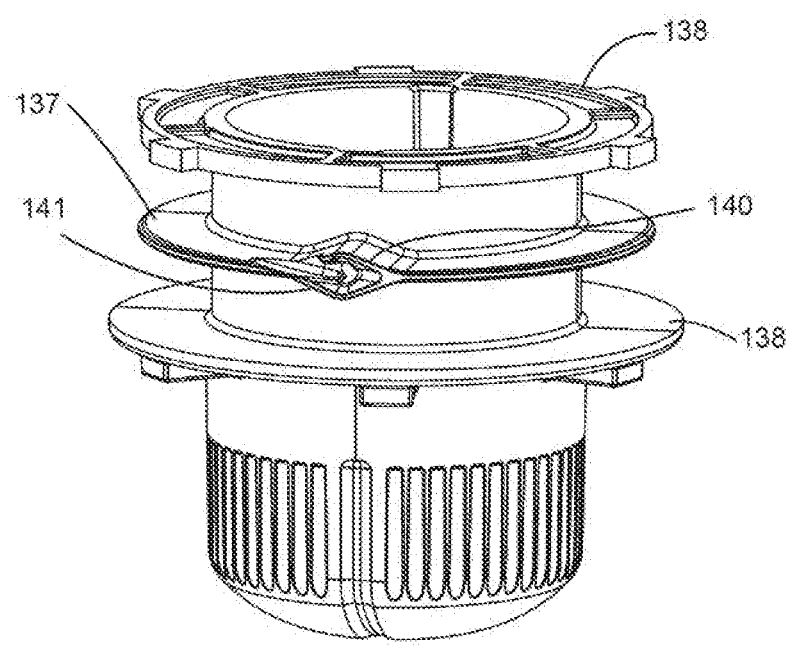

FIGS. 6-8 show another embodiment of the invention having an example of variation in the placement of the ratchet components and includes a central flange for dividing the trimmer line into an upper and lower chamber. In FIG. 6, a central core 116 of a trimmer head 110 has a number of cogs 152 on an upper disk 138 that cooperate with a number of stops 154 (FIG. 7) provided in the upper portion 121 of the housing. The followers 144 on core 116 and ramps 146 on lower housing 132 cooperate to form the trimmer line winding ratchet. The spring 150 biases the core 116 into proper axial position as discussed above. In this embodiment, the knob 132 is preferably formed as an integral part of the core 116.

The core 116 has a different configuration for accepting an amount of trimmer line onto the core 116 into two separated chambers. By separating trimmer line as it is fed in through the left and right eyelets 118 into separate chambers, there is less chance that the line will tangle with itself and can avoid line "fusing" to itself. Because trimmer line can be thicker and stiffer than for example "fishing line," the line can tend to straighten itself out ("unspool") in the trimmer head and then tighten in use. These cycles can cause the line to wind on itself or even weld/fuse to itself under the heat of friction. Separating the lines can lessen the chance of these problems and increase the ease and reliability of feeding out line during operation. To facilitate the line winding onto the two chambers (instead of all the line feeding into on chamber), the openings 140 on either side on the center flange 137 open on diverse sides of the flange. One opening has its mouth 141 opening above flange 137 to feed line into the chamber formed between the upper disk 136 and flange 137. The opposite opening 40 is the mirror image with a mouth opening towards the bottom of flange 137 to feed line into the chamber formed by flange 137 and disk 138.

In operation, knob 130 is rotated to cause followers 144 to rise up and over ramps 146 to allow the core 116 to rotate relative to the housing 121,132. The rotation of the core causes line fed through the housing eyelets 118 through the trimmer line feed channel opening 40 and out the opposite eyelet to wrap around the core 116. Because of the varied orientation of the mouths of openings 140, different portions of the line will wrap into the individual chambers formed above and below flange 137. When trimmer line is required to be fed out to increase the length of the active cutting section of the line, the use will strike ("bump") the knob on the ground of other surface. The bump will cause the followers 144 to lift above ramps 146, and centrifugal on the trimmer line will cause the line to pull against the core to rotate the core in the direction (relative to the housing) necessary to feed the line outward, regardless of the overall rotational direction of the trimmer head. The rotation of the core relative to the housing will be checked by the cogs 152 striking the stops 154 to control the amount of line fed during one "bump" of the knob 130.

Figure 9:
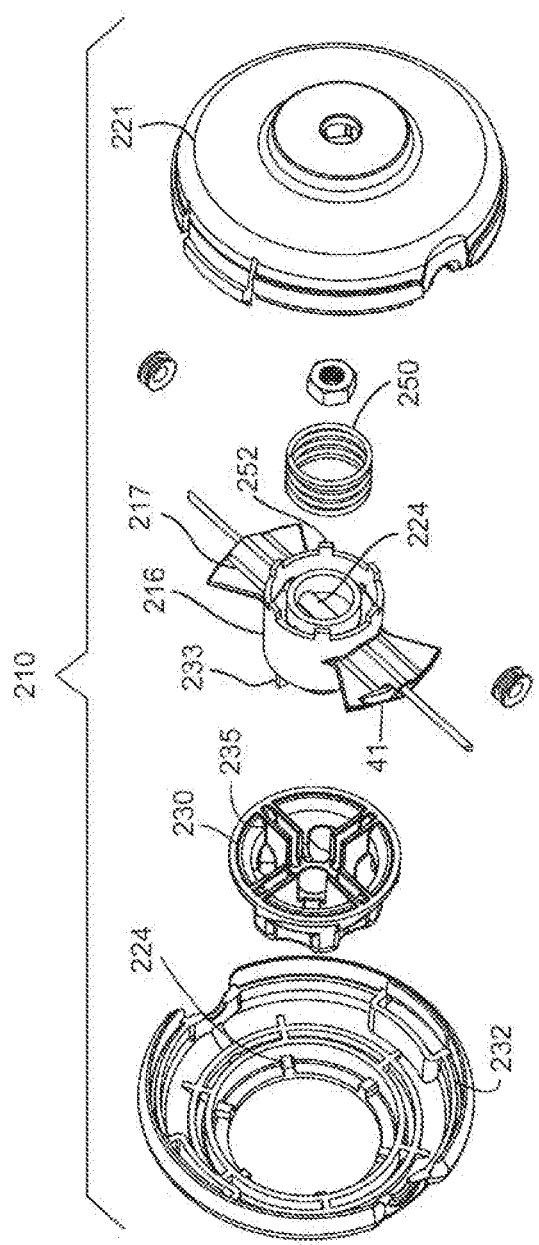
FIGS. 9-12 show views of a trimmer head according to a further embodiment of the invention having a flangeless spool.
Figure 10:
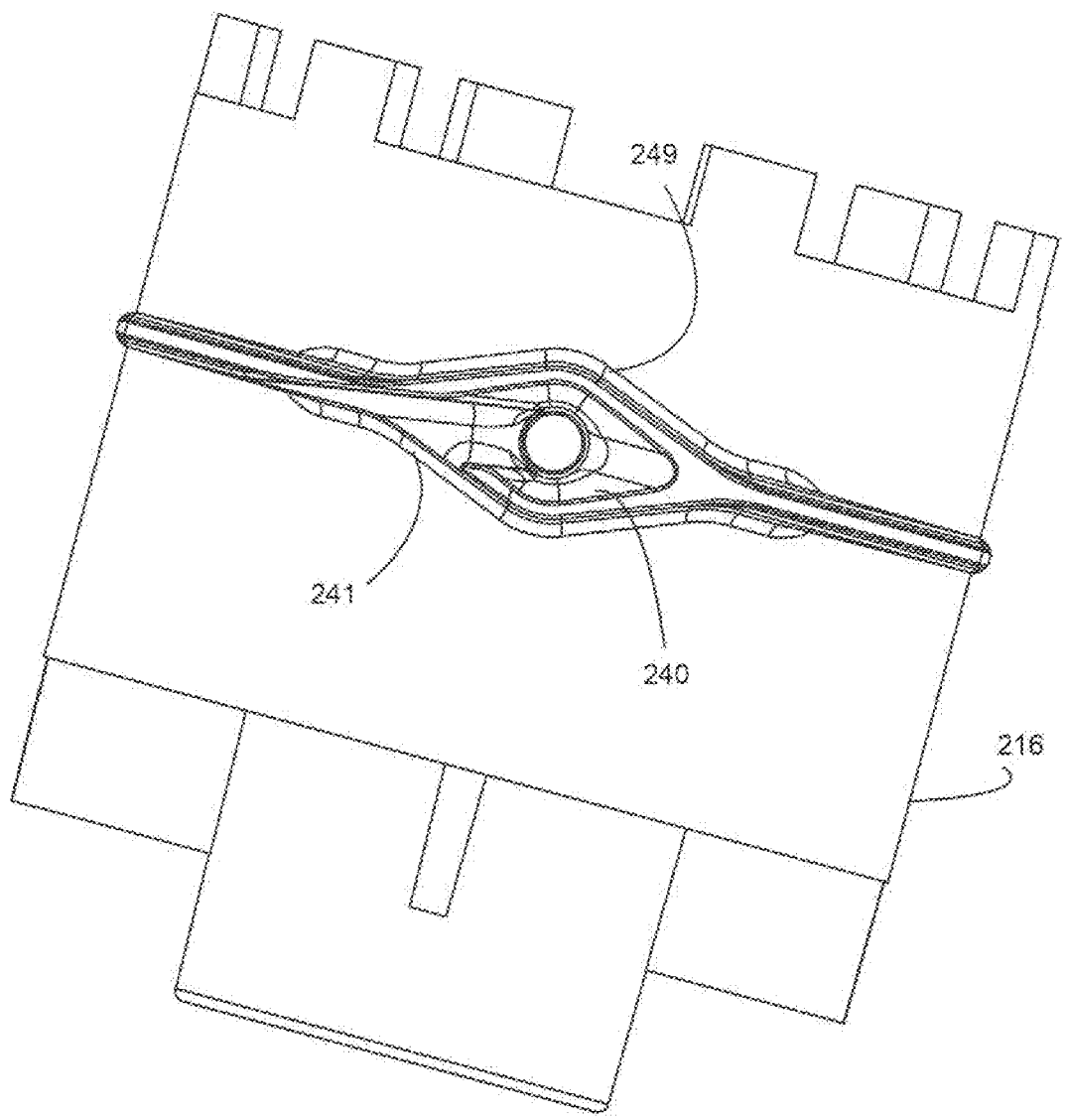
Figure 11:
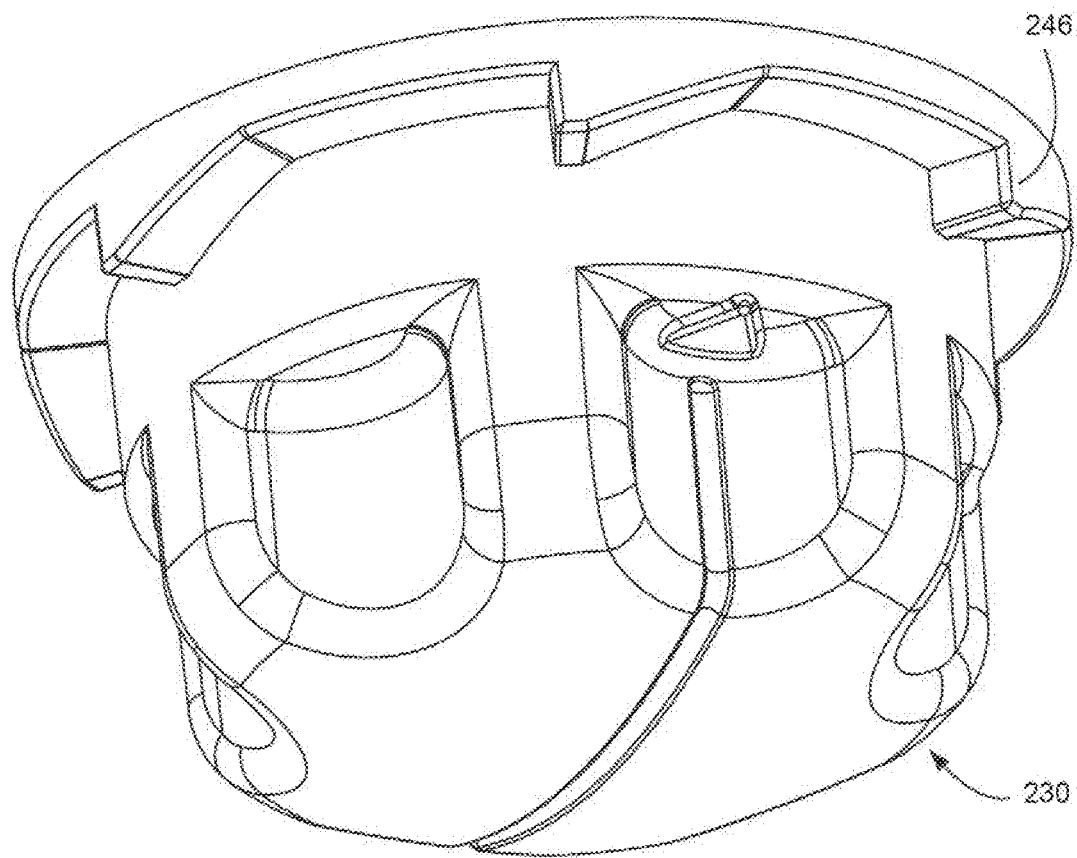
Figure 12:
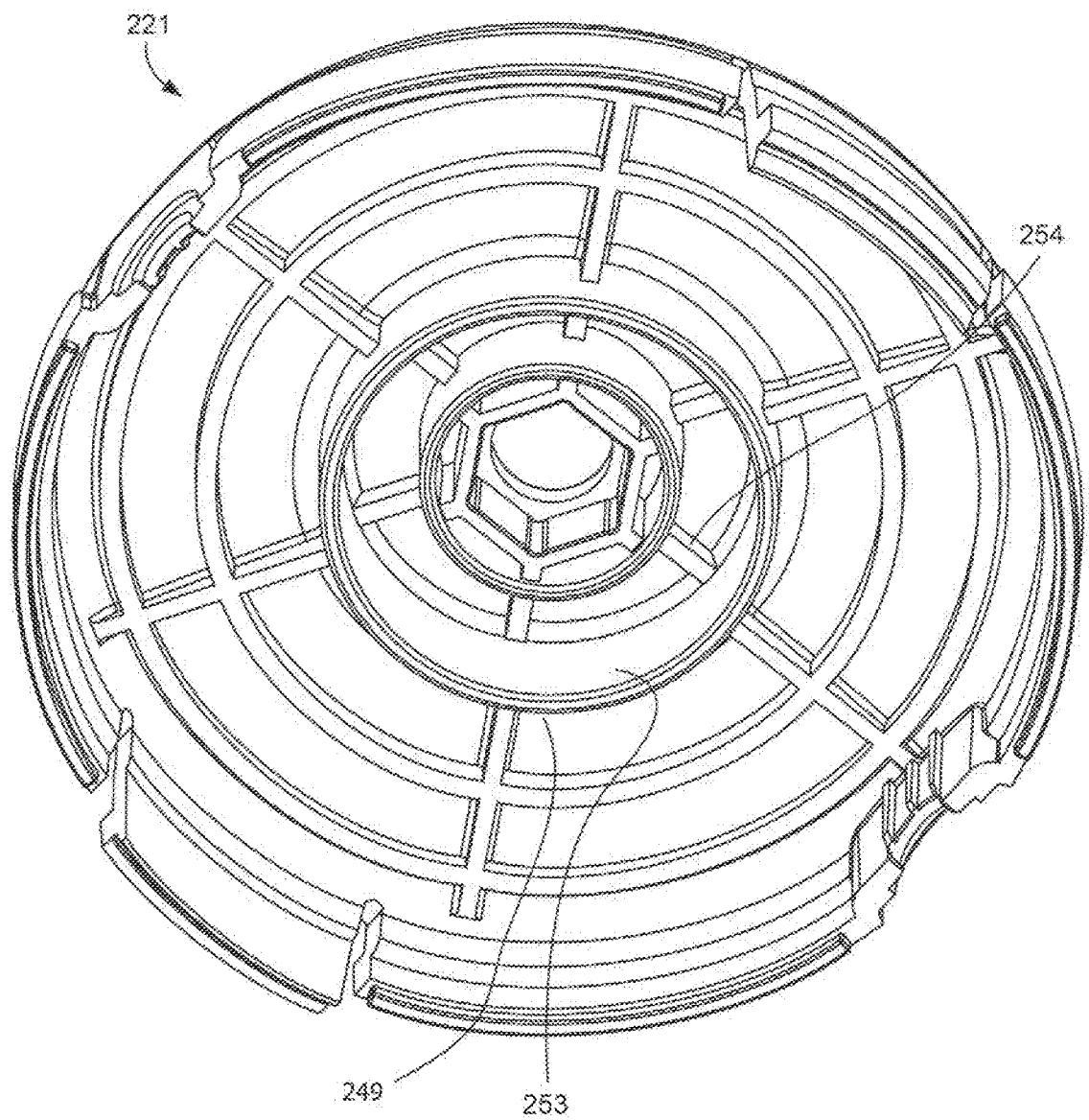

FIGS. 9-12 show an alternative embodiment having a flangeless core and which distributes some of the ratcheting components to a knob separated from the core. FIG. 9 shows an exploded view of the trimmer head 210. The core 216 is rotatingly tied to the knob 230 by arms/splines 233 engaged with corresponding slots 235 that will cause the knob and core to fixedly co-rotate together. The knob and core and bias spring 250 are located and biased into position between the lower housing 232 and upper housing 221. A number of square teeth 252 cooperate with corresponding stops on the upper housing 221 to form the feed control ("indexing") mechanism as described above to limit the amount of line fed out during "bumping" of the trimmer head knob 230.

The upper housing 221 has a guide wall 253 (FIG. 12) for receiving the outer wall of the core. The guide wall serves a number of purposes. Firstly, it centrally locates the core 216 within the housing. With the knob 230 centered in lower housing 232 and the core located in the upper housing 221, the core and knob will be guided to rotate securely within the housing about a fixed axis. Additionally, the guide wall causes the square teeth 252 to properly align with stop bars 254 as described above. The stops and teeth will limit the amount of free rotation of the core during "bumping" and will only dispense a limited amount of line per bump. It should be noted that while the wall 249 of the upper housing 221 is shown as surrounding and securing the core 16, it is preferable that the wall 249 is provided within the core (see for example, FIG. 1) so that the core can rotate about the wall 249. This allows the line to wrap around the upper section of the core instead of around the upper housing wall 249, which lessens the friction on the line as the core rotates independent of the housing 221.

The lower housing includes a number of followers 244 that cooperate with the ramps 246 (FIG. 11) to provide the ratcheting function to allow winding of the trimmer line onto the core 216 while preventing unintended rotation of the core relative to the housing. In operation, the spring 250 biases the core downwardly. The core 216 presses down on the knob, which forces the ramps 246 and followers 244 into axial alignment. Rotation of the core rotates the knob until the ramps engage the followers. If the torque on the knob is increased, such as by manually turning the knob 230, the followers will force the ramps upward against the bias of the spring 250. If enough torque is applied, the ramps will pass over the followers 244 and the spring will force the ramps back down into alignment with the followers in a ratchet-like motion. The rotation allowed by passing the ramp over the follower will allow the core to rotate relative to the housing to wind additional line around the core. The axial spacing of the ratchet mechanism may be such that the height that the knob moves as the ramp goes over the follower is insufficient to bring the square teeth 252 into engagement with the stop bars 254 and thus the stops will not interfere with the rotation of the core during winding of the line onto the core as the knob is rotated.

The core 216 itself is flangeless. It does not require an upper or lower disk or a central flange to coordinate the winding of line onto the core. The core has a number of arms 217 that extend the length of the trimmer line feed channel 224 from one eyelet 218 to the other. The channel terminates into opposing openings 40. The opening on one side of the channel has a mouth 41 opening upwardly and the other opening has a mouth opening downwardly. Line fed upwardly feeds into an area of the housing bounded by the arm 217 and the upper housing 221. The guide wall 253 prevents the line from interfering or entangling with the rotating core or with the square teeth 252 at the upper end of the core. Line fed downwardly feeds into an area of the housing bounded by the arm 217 and by the lower housing 232. Additional line that feeds in as the core rotates past the eyelet again continues to wind onto the proper area above or below the arm 217 because the line is pulled above or below the eyelet by the length of line already within the housing. The distance that the walls 249 of the opening of the channel extend above the arm, for example, helps ensure that further line will also be fed in above the arm since that section of the line is already biased in that direction pulling the line above (or below as needed) the arm. In this way, the core does not require a top, bottom or center flange to control the orderly storage and maintenance of line within the trimmer head housing.

Figure 21:
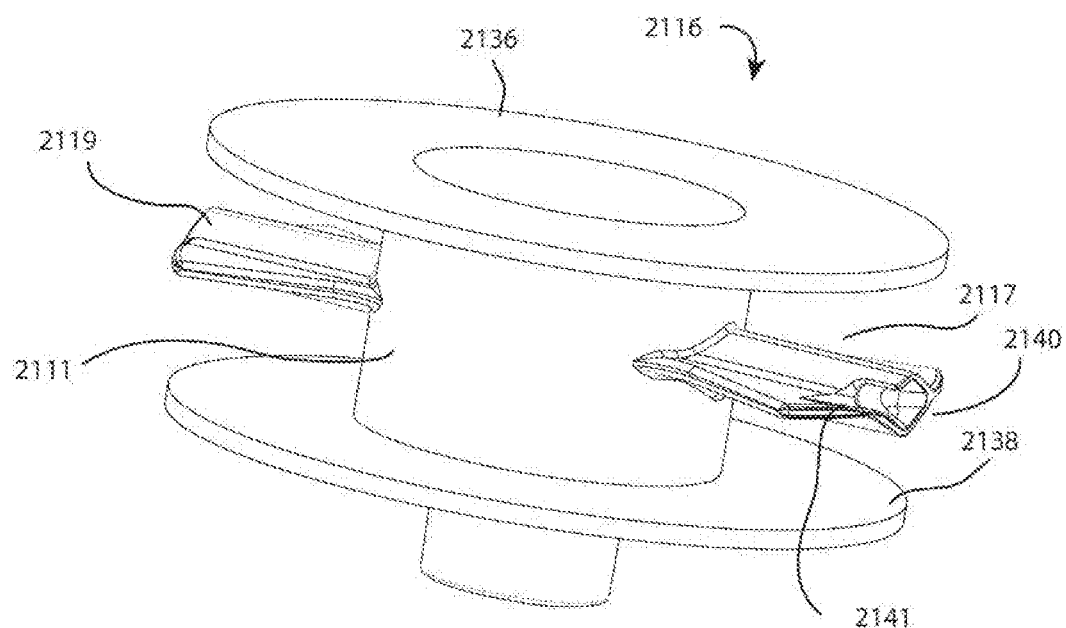
FIG. 21 shows an alternate spool having spokes instead of a center flange for use with at least one embodiment of the invention.

FIG. 21 shows an alternative embodiment of the invention having an upper and lower flange, but no center flange. The spool 2116 has an upper flange 2136 and a lower flange 2138. This could for example be used in place of the spool of FIG. 6. Appropriate cogs, ramps and/or stops could be provided as necessary to mate with ramps, cogs or stops on the housing. A bump knob (not shown) could be provided that would mate at the bottom of the spool or provided integral to the spool. In operation, a line fed through the opening 2140 would be fed through the other side to openings (118, FIG. 6) in the housing.

As the spool was rotated, the line would feed out the side openings 2141 of the spoke or wing 2117 and would wind around the central wall 2111 of the spool. A flange is not required because the spokes would act to separate the line into the top or bottom opening according to whether the channel opening 2141 opened to the top or bottom of the wing 2117. In practice, during the next rotation around the line in the top chamber will be taught and spaced above the top 2119 of the spoke 2117. The spoke can be flared (expanded in the radial direction) to help ensure that the line wraps in the proper direction. This will act to pull the next bit of line still above the wing so that it also wraps in the top chamber. Line in the bottom chamber will analogously wrap in the bottom chamber. The top and bottom flanges will act to maintain the line on the spool. Additional spokes or wings could be provided about the core of the spool. These additional spokes could have passages therethrough to allow additional trimmer lines to be used or can be used as alternate passages in case the primary passage through the spool is blocked by a broken line or the like. The additional spokes could also be provided without passages (not shown) therethrough to help ensure that the line continues to wind into the proper channel as line control spokes. The spool will otherwise act in a similar mode to that of FIG. 6.

Figure 13:
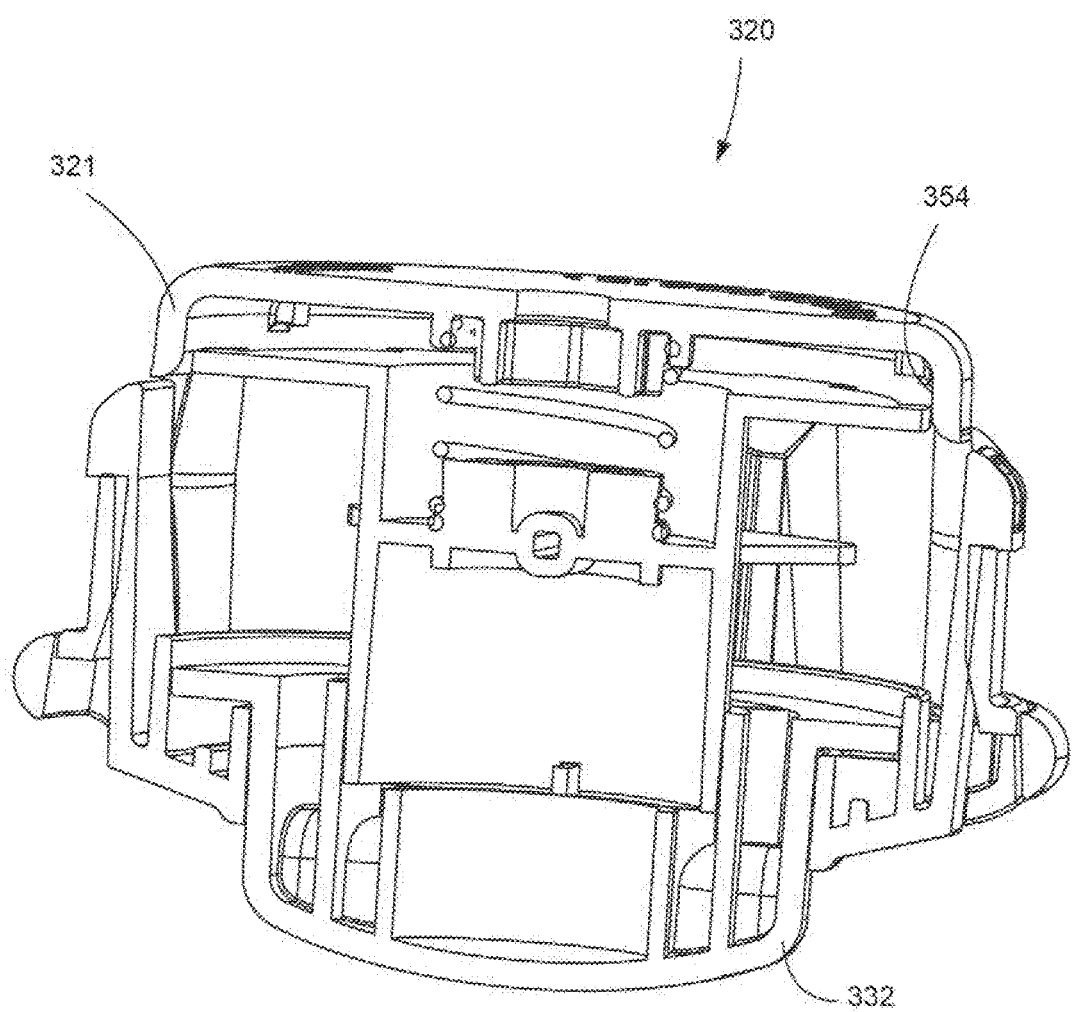
FIGS. 13-14 show views of a trimmer head according to a further embodiment of the invention having passages in the bottom flange of the spool.
Figure 14:
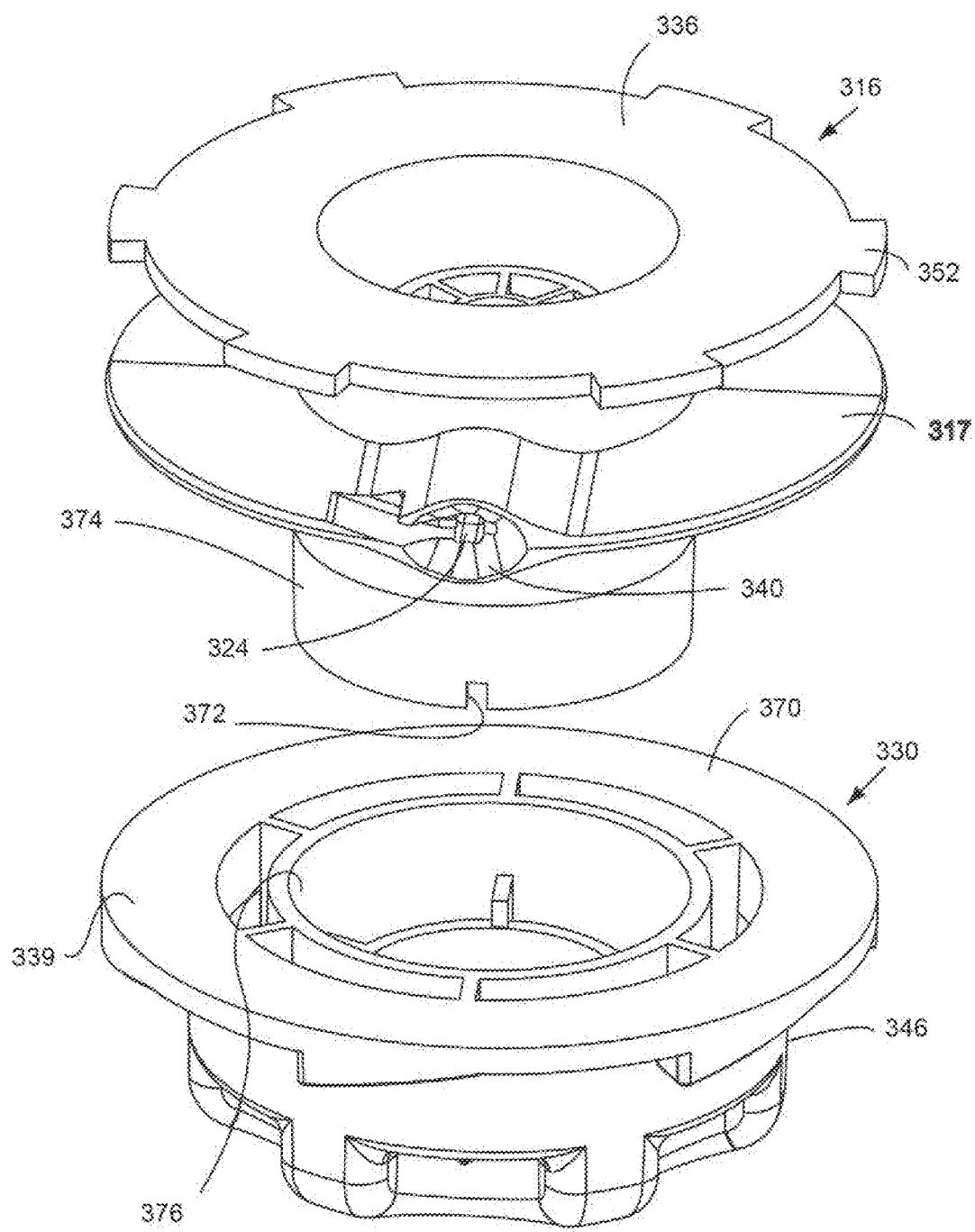

FIGS. 13-14 show a further embodiment of the invention. FIG. 13 is a cross-sectional view of a trimmer head 310 utilizing a core 316 having no bottom flange. As seen in FIG. 14, the core 316 has a central flange 317 with a straight through trimmer line feed channel 324. An upper disk 336 (FIG. 14) carries cogs 352 that cooperate with stops 354 on the upper housing 321 to form the trimmer line dispensing control mechanism. The channel 324 terminates in a pair of opposed openings 340. One opening biases trimmer line into a chamber formed between the upper disk 336 and the central flange 317. The opposite opening has a mouth that biases that section of trimmer line downward to the area of the housing formed between the flange 317 and the interior of the lower housing 332 and the knob 330. The knob may have an upper surface ("shelf") 339 to prevent line accumulating thereon from spreading into unintended areas during rotation and to define a lower chamber for receiving line therein. A lower tubular portion 374 of the core 316 may be provided to extend into knob to further secure the core to the knob and to promote rotation of the core about the central axis of the trimmer head. Since the core 316 and the knob are fixed together by a slot 370 and groove 372 on the core extension 374, the line will rest on the upper surface as the knob and core co-rotate therewith. To release trimmer line, ramps 346 on the knob cooperate with followers on the lower housing (see FIG. 9, reference 244) to allow the trimmer line to be wound onto the core 316 as discussed above.

Figure 15:
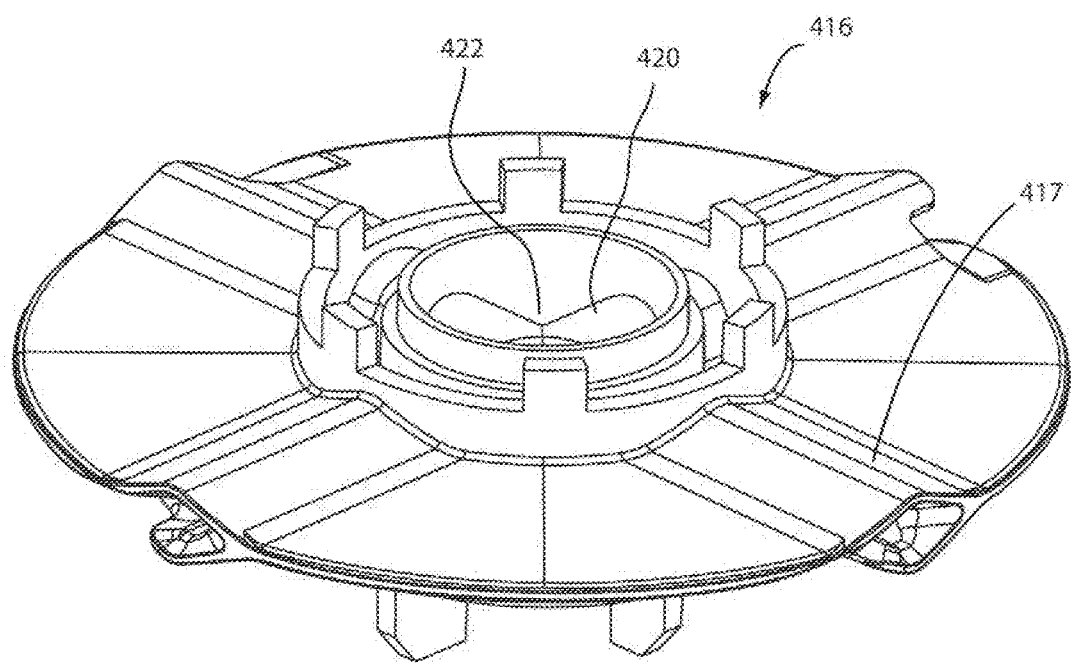
FIG. 15 shows an alternate spool having multiple passages therethrough for use with at least one embodiment of the invention.
Figure 16:
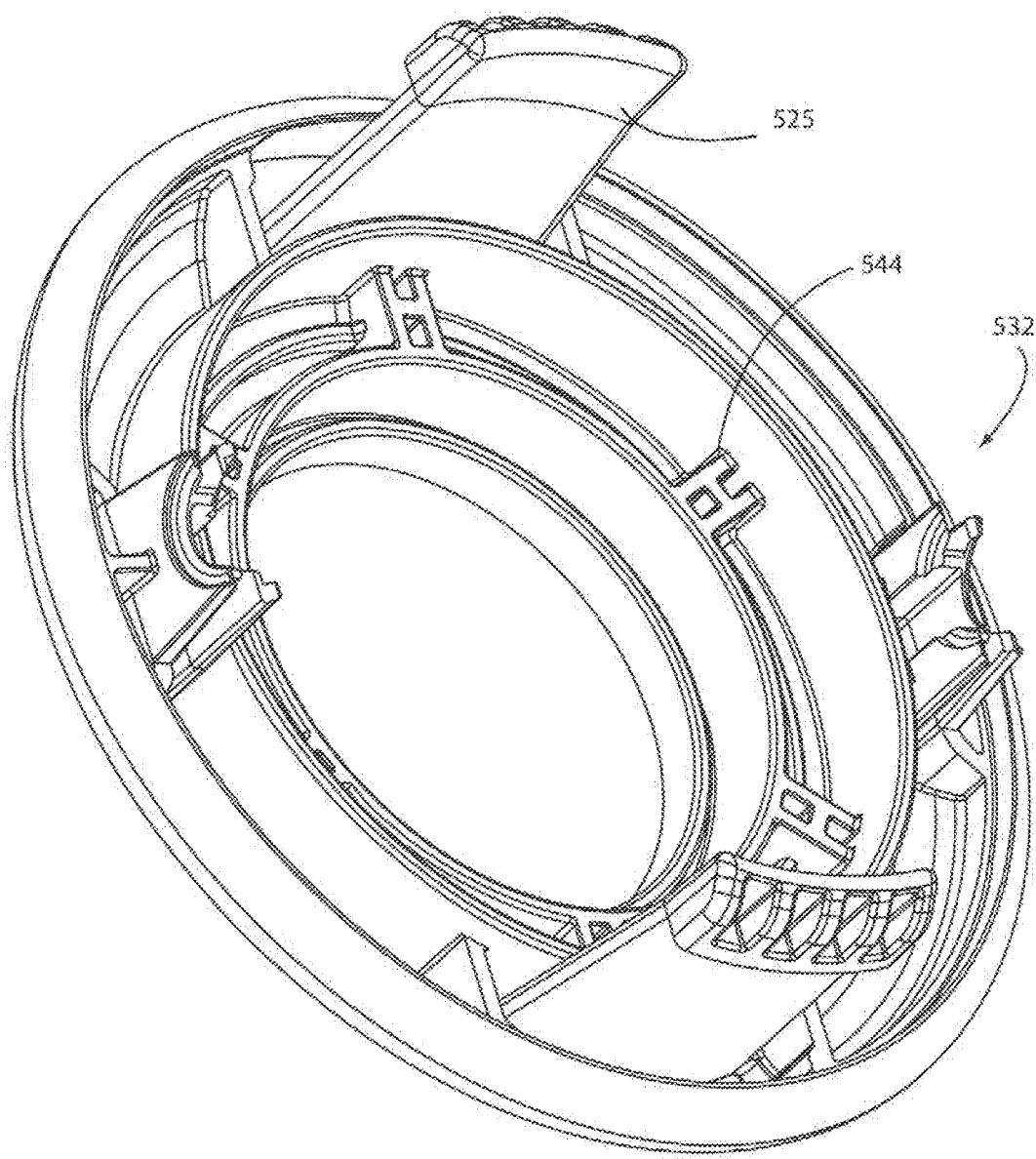
FIGS. 16-20 show views of a trimmer head according to a further embodiment of the invention having a non-circular spool.
Figure 17:
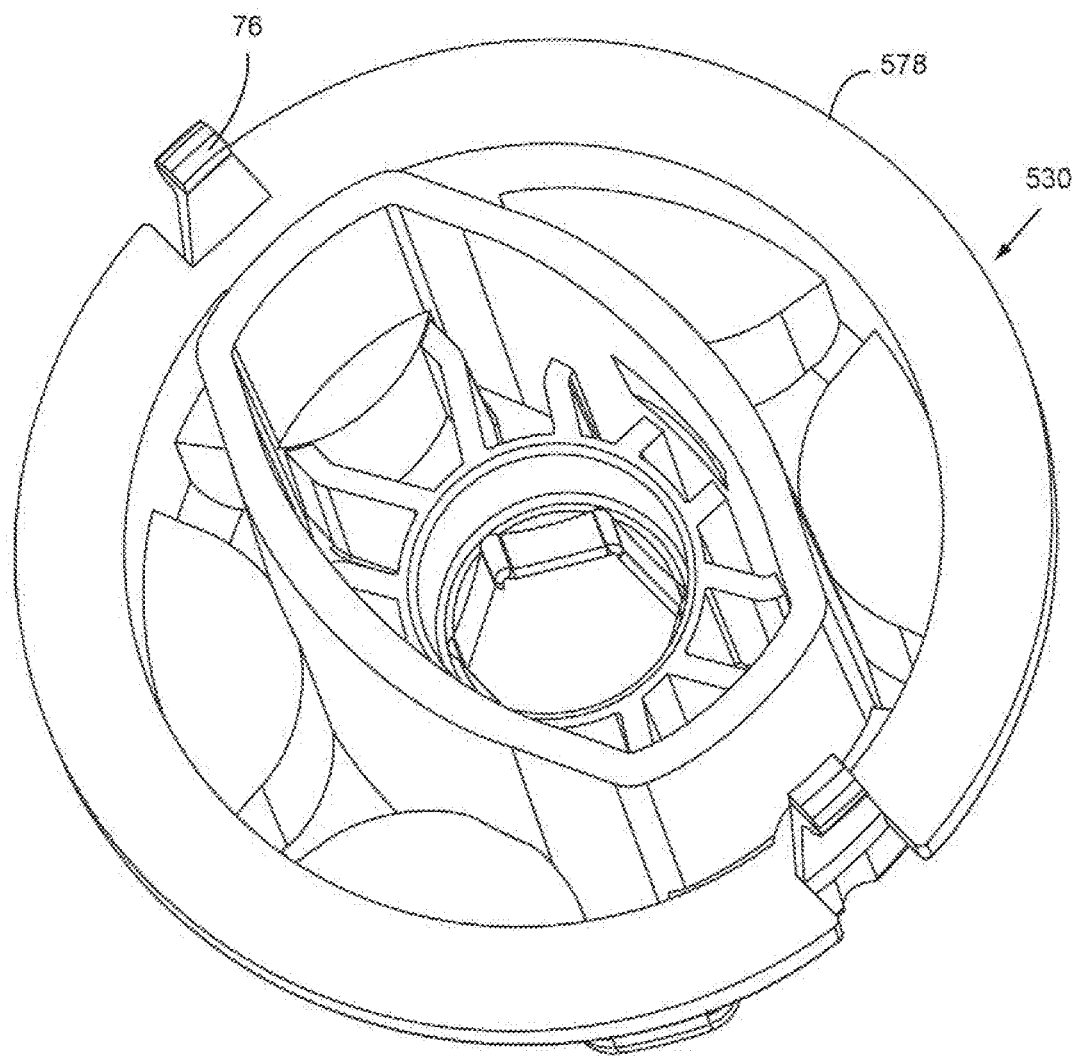
Figure 22:
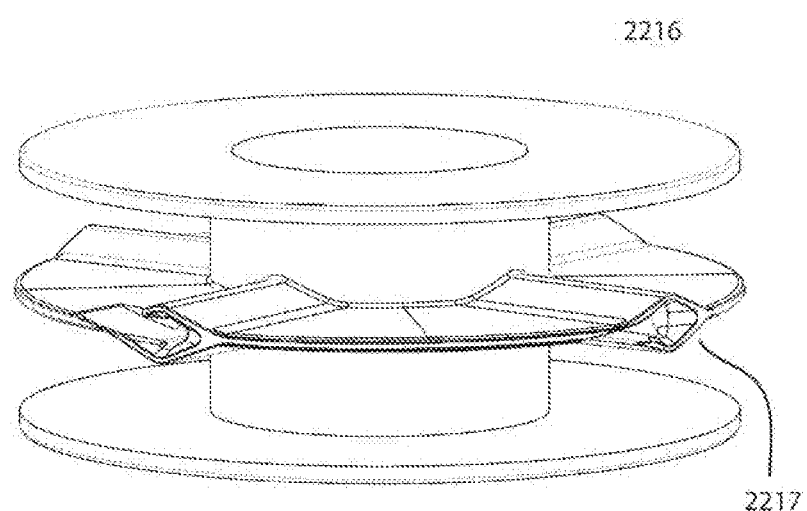
FIGS. 22 and 23A-B show alternate spools having multiple passages therethrough for use with at least one embodiment of the invention.

FIG. 15 shows an alternative embodiment of a trimmer head having more than one trimmer head feed channels 424 ("passage"). The core 416 provides a number of feed channels 424. The channels may be connected to the appropriate opposing or adjacent channel by passages 420 in a central module 422 in the core 416 so that the line fed through one channel 417 feeds out of a second channel in the core 416. See fig. The number of lines that can be fed through simultaneously is controlled to one line by the number of eyelets on the outer housing (see for example, FIG. 1) and is typically only one line. However, it may be desirable to provide additional channels on the core 416 for various reasons including in case one channel gets blocked by broken line or debris. Additionally, channels could be provided to receive different types/diameters of trimmer lines or for other purposes. The channels could cross each other in the middle so that are in communication with each other or one or more of the channels could each bend slightly so that the channels cross over each other. Depending on the requirements of the core 416, the openings on each channel could cause the line to all flow into one chamber or to divide onto either side of the channel. The channels could be configured alike or in different configurations as needed. The multiple channels could be provided on a central flange or on a top or bottom disk or on a flangeless core. FIG. 22 shows a similar four channel spool 2216 having four channels/passages 2217 in a central flange. Preferably, the channels openings at the opposite end of the passage would lead into the same chamber to separate the winding of the two trimmer lines.

Figure 23A:
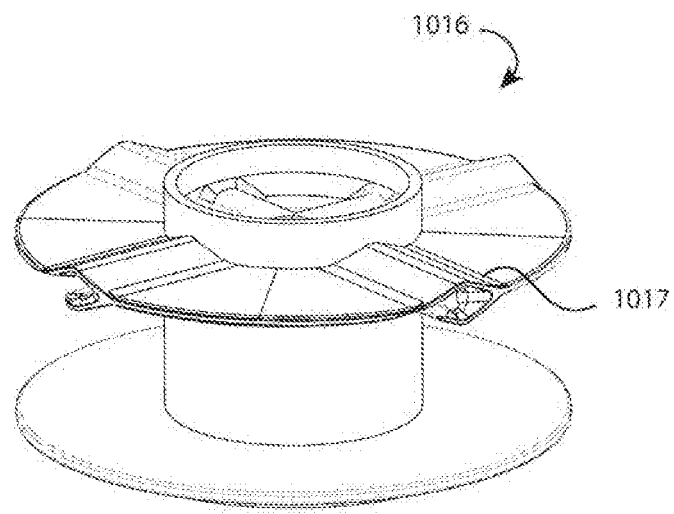
Figure 23B:
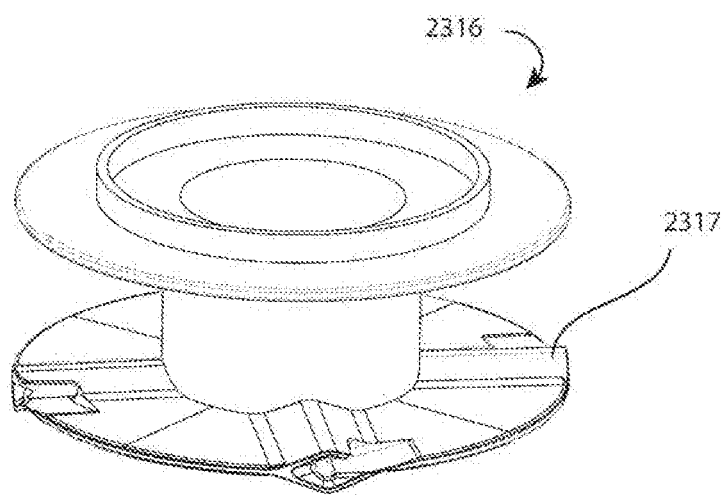

FIGS. 23A&23B show spools 2316 having passages 2317 in a top flange and in a bottom flange respectively. The spool and trimmer housing could also be configured to have passages in both of the top and bottom flanges at the same time to provide for the attachment of multiple trimmer lines or to provide an alternative mounting spot for a trimmer line when one passageway is blocked. A central flange could be provided so that both ends of the trimmer line from the top flange are stored in the top chamber and both ends of the trimmer line from the bottom flange are stored in the bottom chamber.

Figure 29:
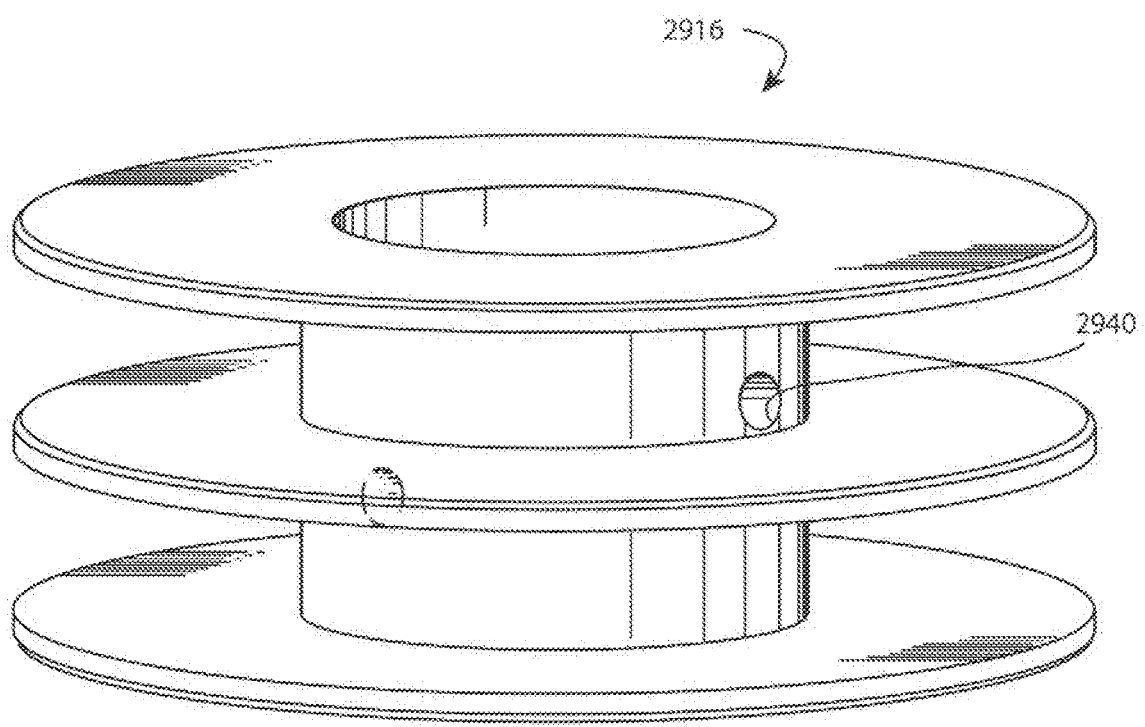
FIG. 29 shows an alternative spool having no passages through a flange of the spool for use with at least one embodiment of the invention.

FIG. 29 shows an alternative version of the spool 2916. In this embodiment there is no path/channel/passage through the center flange. Instead, there are two passageways extending through the spool, each 90 degrees from each other, so that two trimmer lines can be extended through the spool. Each passageway has a terminating opening/hole 2940 at each end of the passage. The opening 2940 in the core of the spool determines whether the line will wrap into an upper chamber or into a lower chamber. Preferably, the hole at the opposite end of the passage would lead into the same chamber to separate the winding of the two trimmer lines. The drawback to this design is that it may require an artificial aid to thread the line through the eyelet and through the spool. This could be accomplished several ways including the use a straw or other device or by disassembling the trimmer head to thread the line properly. For these reasons, this design is less preferable to other designs, but may accomplish goals at a lower cost, for example.

Figure 18:
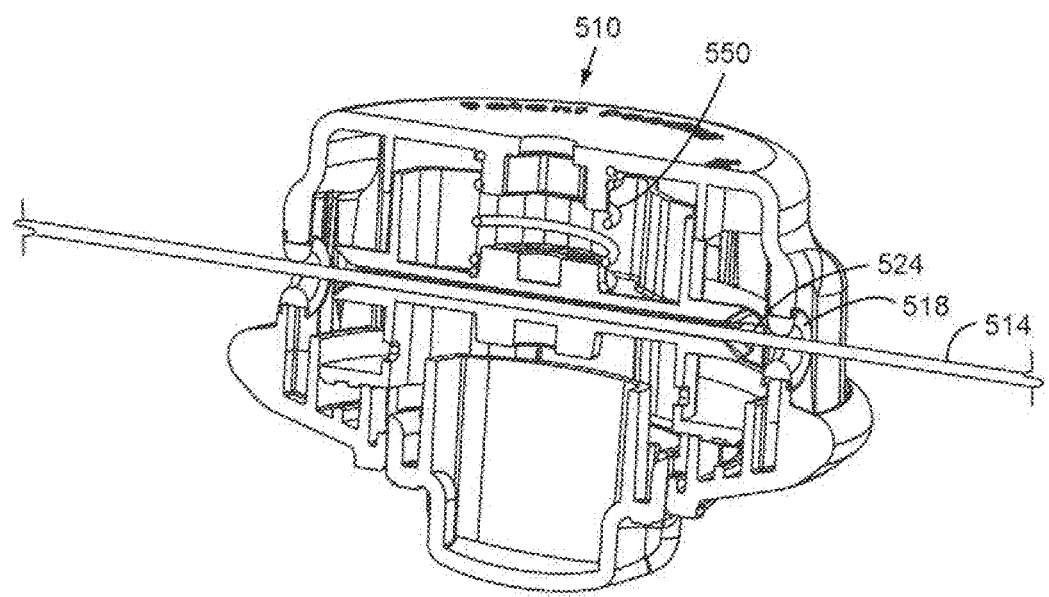
Figure 19:
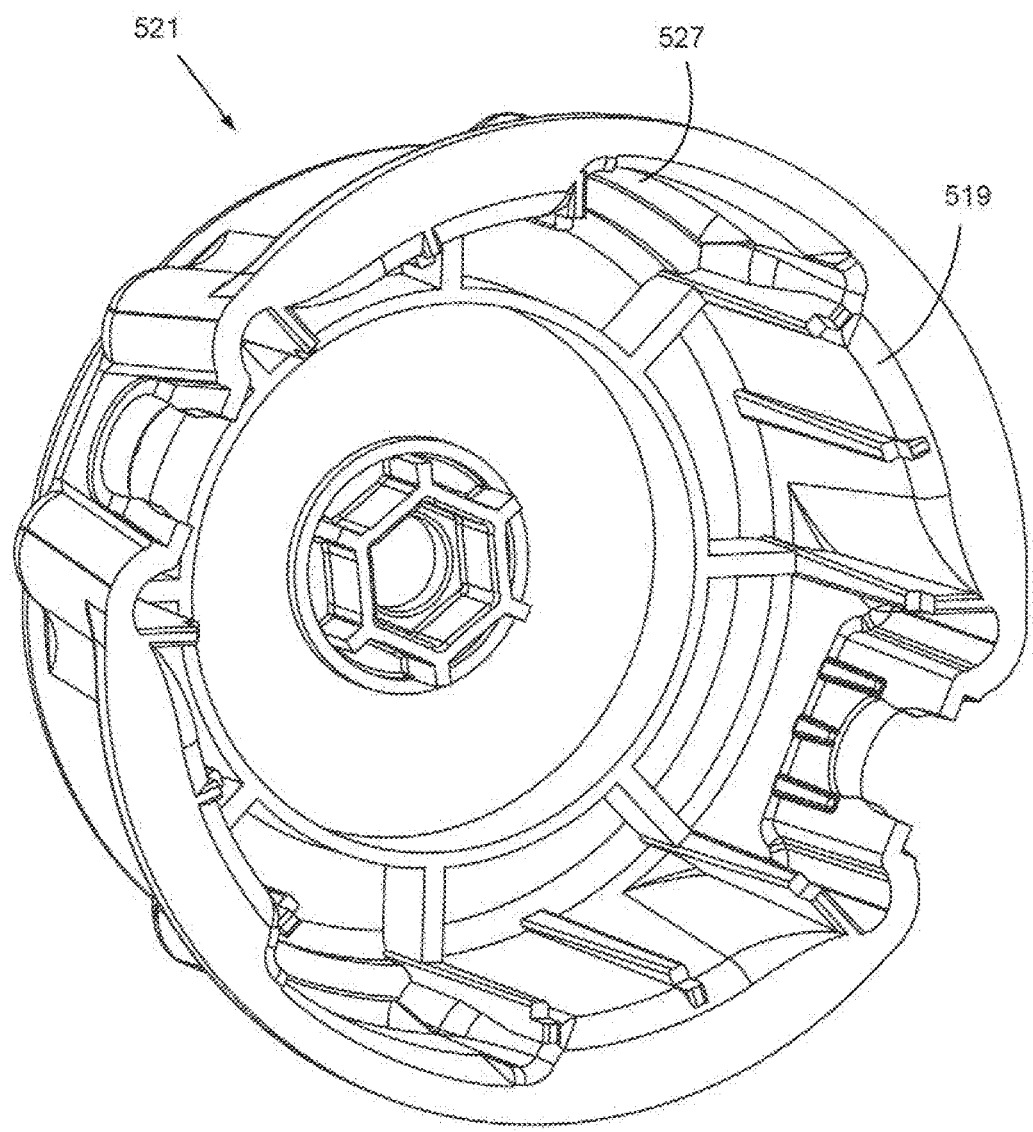

FIGS. 16-20 show an additional embodiment according to at least one aspect of the invention having a non-tubular core. FIG. 18 is a cross-sectional view of the trimmer head 510. The trimmer head 510 includes an upper housing 521 (FIG. 19) and a lower housing 532 (FIG. 20) with a core 516 (FIG. 16), a spring 550 and a knob 530 (FIG. 17) housed therein.

The upper housing 521 has a keyed chamber for receiving a fastener to connect the trimmer head 510 to the arbor of a string trimmer machine. The housing interior is shaped through a number of spacers 519 around the wall to receive the outer diameter of the flange 517 so that the core 516 rotates within the housing about a central axis. That is, the core can rotate without undue wobbling, etc. The housing has a number of eyelets 518 that may include metal or plastic guards or sleeves to prevent wearing of the housing as trimmer line 514 is added to or removed from the housing. The upper housing 521 is connected to the lower housing as appropriate.

Figure 20:
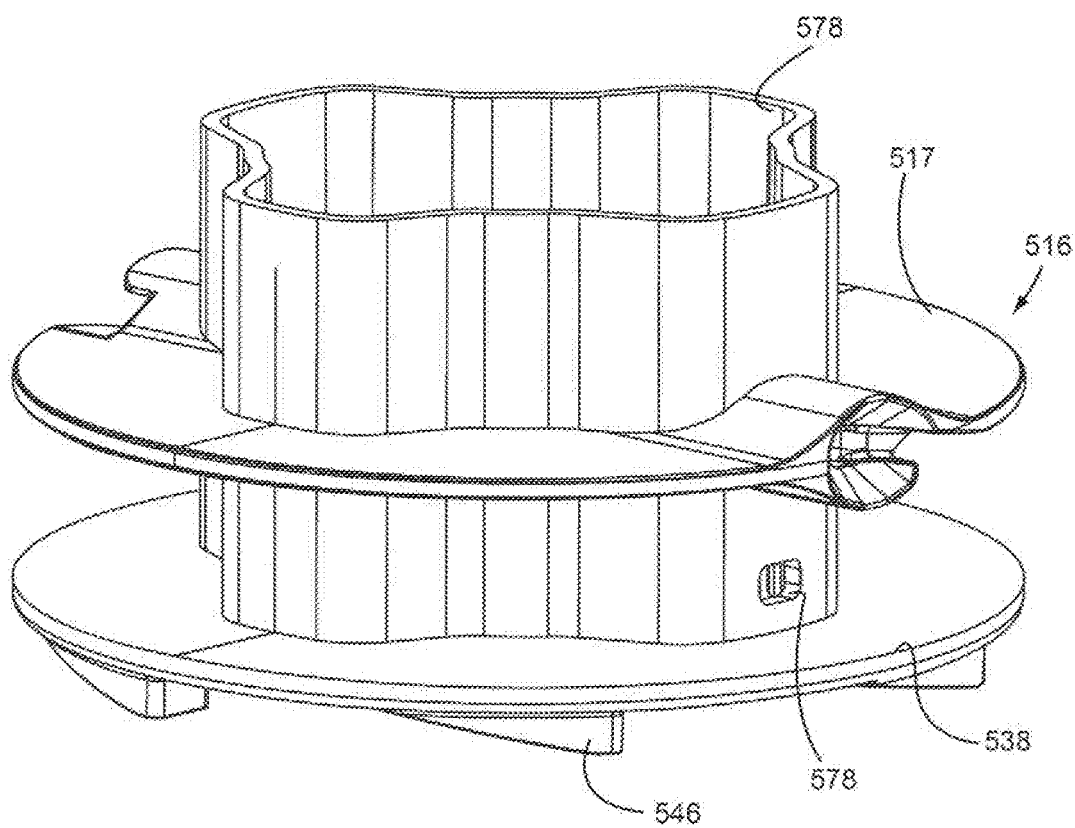

FIG. 20 shows the lower housing having flexible collet-like fingers 525 that secure within openings 527 within upper housing to provide a quick release connector between the upper and lower housing. Pressing the fingers 525 inwardly releases the fingers from the openings 527 so that the housing can be separated into the upper and lower housing parts. Likewise, knob 530 can be secured to the core 516 by fingers 76 cooperating within openings 576 on the core or by other fasteners or threading. The walls of the key 578 on the knob are dimensioned and shaped to fit within an opening on the bottom of the core 516. Preferably the opening is the same shape and dimensions as the inner walls 578 of the core to securely receive the knob so that the knob cannot rotate relative to the core. One skilled in the art would recognize that the invention could be practiced regardless of the shape chosen for the knob's key and the corresponding opening in the core as long as they can cooperate with each other.

The core has a center flange 517 for separating the incoming halves of the trimmer line 514 into a lower chamber formed between disk 538 and flange 517. Trimmer line above the flange 517 is retained within the space between the flange 517 and the upper housing 521. The trimmer line as discussed above is fed from outside the housing through an eyelet 518 through the channel 524 and out the other eyelet. The line is then fed onto the core by turning the knob, which rotates the core 516 to wrap the line around the core. Cooperating ramps 546 and followers 544 control unintended rotation of the core relative to the housing, while allowing desired rotation by turning the knob with sufficient torque to cause the ramps to move past the followers for the desired amount of travel as discussed above.

The presently described embodiment preferably does not include an indexing system having separate stops and cogs or square teeth. The stops are utilized in some of the embodiments to control the amount of line fed through the eyelets per "bump" of the knob. It has been found that the amount of line fed out during a "bump" can be adequately controlled simply from the ramps and followers. When the knob is bumped or pressed by a quick tap of the trimmer head on the ground, there may be a small time gap before the core actually begins to turn. If the rebound force of the spring 550 is specified properly and the number and positioning of the ramps is properly built into the trimmer head, then the return time that it takes to press the core back down into the original position and place the ramps on or between the followers is sufficient to only allow a small amount of rotation of the core before the ramps hit a follower and stop rotation of the core relative to the housing. In this way, the use of only the ramp and follower portion of the ratchet system is sufficient to perform both functions of allowing winding and controlling trimmer line feed.

It will be understood that the embodiments of the present invention that are illustrated and described are merely exemplary and that a person skilled in the art can make many variations to those embodiments. For instance, the number of cog projections, ramp projections and stop projections can be varied provided the numbers for these elements remain equal. Likewise, the shape of the bump knob, the shape of the housing and the shape of the spool can be varied into numerous configurations that are not illustrated. All such embodiments are intended to be included within the scope of the present invention as defined by the claims. None of the embodiments need include any or all of the features of the invention.

New Embodiments

Figure 30:
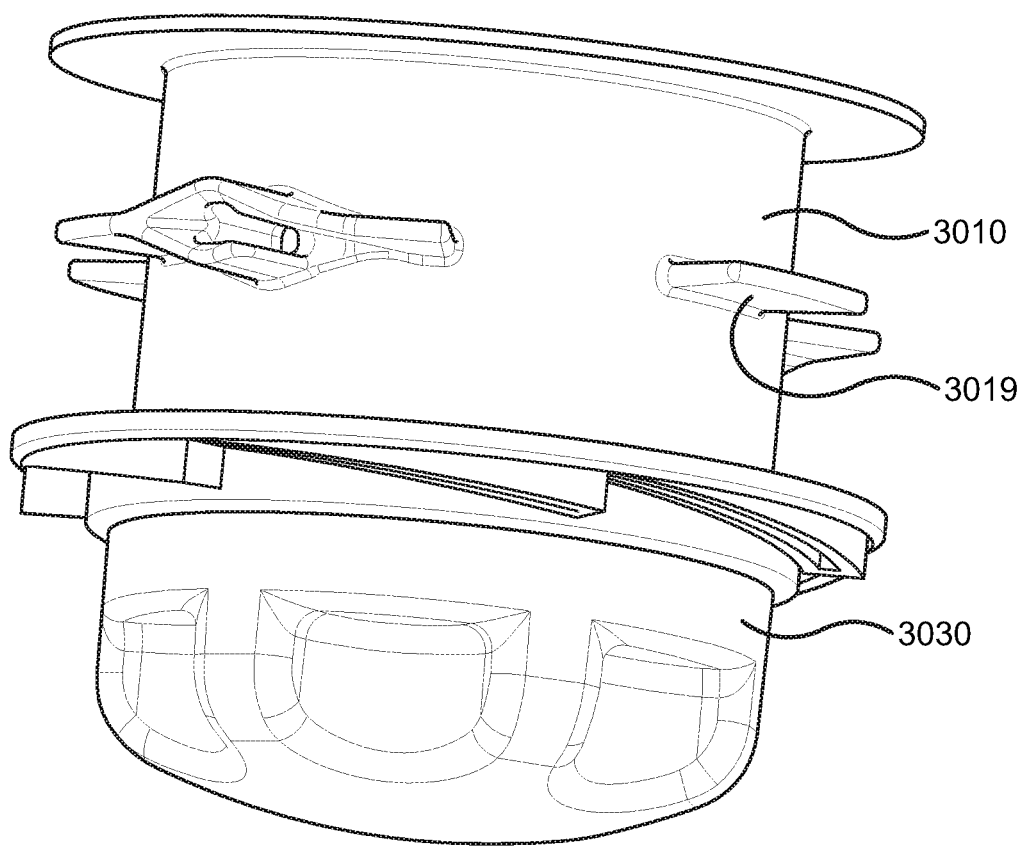
FIG. 30 shows another embodiment the spool having a module for selectively changing the course of the line into or through the spool.

FIG. 30 shows another embodiment of a spool 3010 having a module for selectively changing the course of the line into or through the spool. The spool in combination with the knob 3030 can be provided with ramps, cogs, etc. necessary to interact with a trimmer head housing (not shown) to provide unidirectional or bidirectional operation to dispense trimmer line (not shown) as discussed in relation to the embodiments above and in the prior art. The spool may have one or more line receiving chambers to wind the trimmer line about the spool. Separate chambers for each end of the line to wrap around can prevent the line from "fusing" to other portions of the line by lessening the overall friction and heat on the line.

In the past, spools have used extensive flanges (see for example, FIG. 8, reference 137) to separate the line into an area above and below the flange 137 as the line wraps around the spool core. The present invention according to some embodiments of the invention can use spokes 3019 instead of the flange to reduce the weight and material when manufacturing the spool. The number of spokes can be increased or decreased as necessary to ensure that the trimmer line properly wraps above or below the center line and cannot "cross over" from one chamber into the other chamber. The shape and width of each spoke can be chosen to increase the integrity of the line wrapping. It may also be preferable to increase the height (i.e., along the line parallel to the axis of the spool) to effectively separate the wrapping of the line in one chamber from the other. See for example, FIG. 21. Since the spokes are only acting as a separator and are not under unduly large forces, the spokes offer a lower cost option to a central flange by saving material and weight.

The embodiment of FIGS. 30-31 may also take advantage of the use of modules to convert the spool from a "straight through/radial" spool to a non-radial routing. The easiest way to route a trimmer line through a spool is to have a large opening that extends directly across one the spool along any diameter of the spool, often called the "radial" direction since the line extends from the center of the spool along a radius of the spool as well. See for example, FIG. 24 and module 2470 that route a trimmer line straight through ("radially through") the spool. There may be advantages to routing the trimmer line along non-radial paths as well, for example to provide a little bit more friction to the line so that it is easier to thread and begin winding of the line, without having the line shift unintentionally within the spool. See for example, FIGS. 25A-D.

Figure 31A:
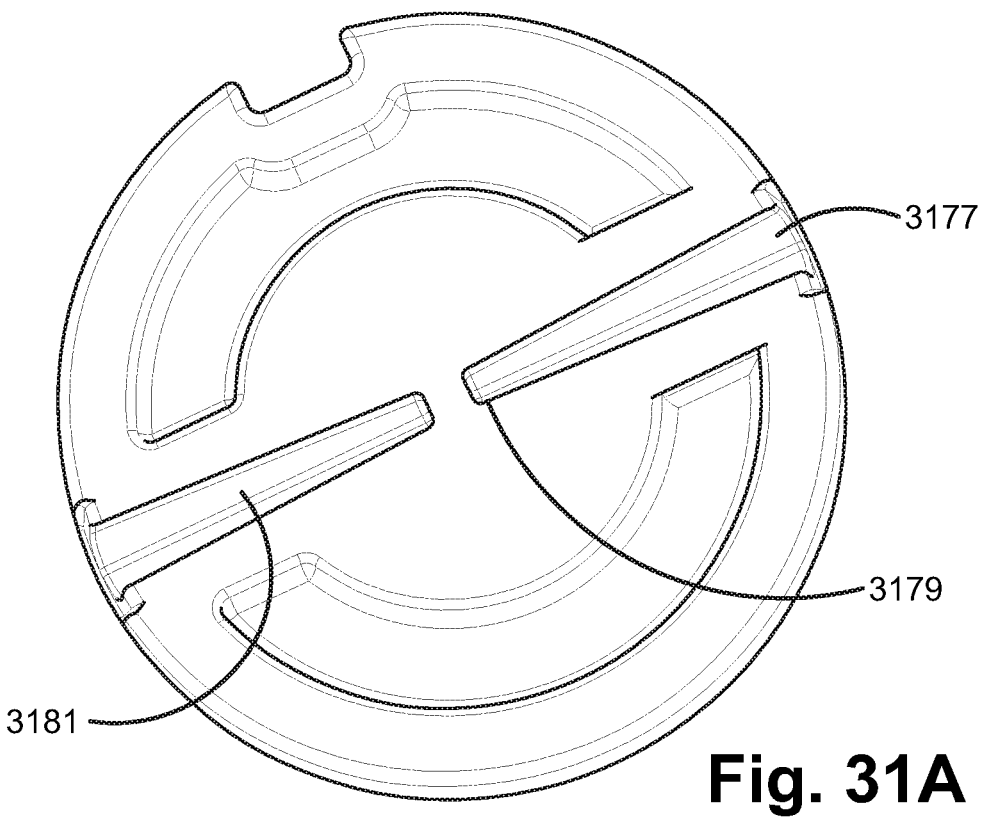
FIGS. 31A, 31B, 31C, and 31D show a number of modules that may be used with the spool of FIG. 30.

FIGS. 31A-E show various module arrangements that can be used to provide optional routing into or through the spool 3010. FIG. 31A shows a radial interference fit module. The module has a trimmer line opening 3177 to receive the trimmer line. By necessity, the opening is larger than the trimmer line so that the trimmer line can be threaded into the line receiving slot. Typically trimmer line is produced in a number of standard sizes in the diameters of 0.065", 0.080", 0.095", and 0.105". The terminal end of the line receiving slot 3181 has a diameter smaller than the line that it receives. In this way, the trimmer line can be interference fit inside the slot such that the line is pushed in to slightly compress the trimmer line within the slot to anchor the line in the slot. The amount of force required to properly seat the trimmer line in the slot is slight because the line will immediately be bent more than 90 degrees as it is wrapped around the core of the spool. the bending torque on the line and the interference fit will both increase the friction resisting the line from coming out of the slot as the line is wrapped around the spool Once the wrap has completed a complete revolution around the core and preferably additional wraps around the spool, the line is secure enough that the line can be used by the rapidly rotating trimmer head to cut grass or weeds without having the line end come out of the slot. When the line has been worn down to a very short length and is no longer wrapped around the core, then the remaining line may be automatically ejected out of the line receiving slot and out of the spool under the centrifugal force produced by the rotating trimmer head. Alternatively, the residual line can be pulled easily out of the line receiving slot and a new line can be inserted and wound around the spool.

Figure 31B:
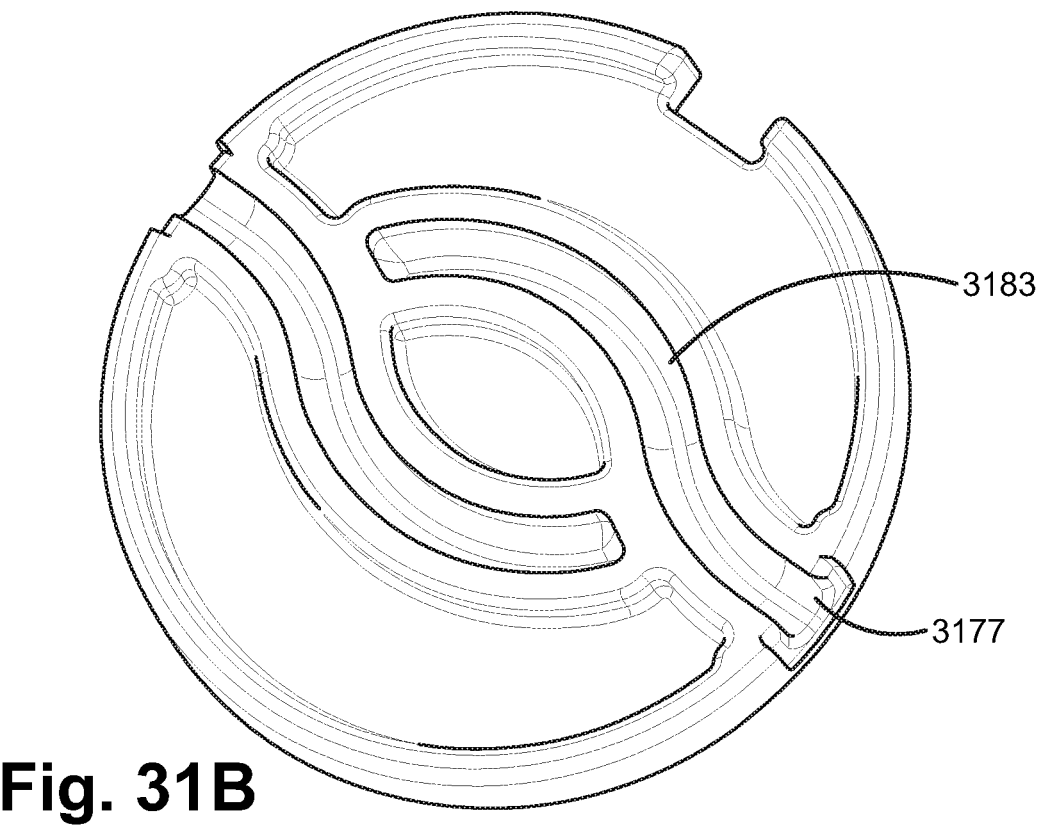

FIG. 31B shows a curved ("non-linear") line receiving slot 3183 for receiving trimer line. As in FIG. 31B, instead of using a single piece of trimmer line threaded through the spool core with roughly half of the line extending out each side of the spool, the line receiving slots require that more than one trimmer line segment be threaded through the plurality of line receiving slots. In FIG. 31B, there are two slots for receiving two total trimmer line segments. One skilled in the art would recognize that more than two slots could be provided for receiving one trimmer line segment in each line receiving slot. One skilled in the art would also recognize that the number of slots and number of lines should each be chosen so that the load on the trimmer head is equally distributed about the trimmer head. For example, two slots and two line segments, three slots and three line segments, or four slots and two line segments would all result in a balance trimmer head, but four slots with three line segments extending therefrom could result in an unbalanced trimmer head.

Figure 31C:
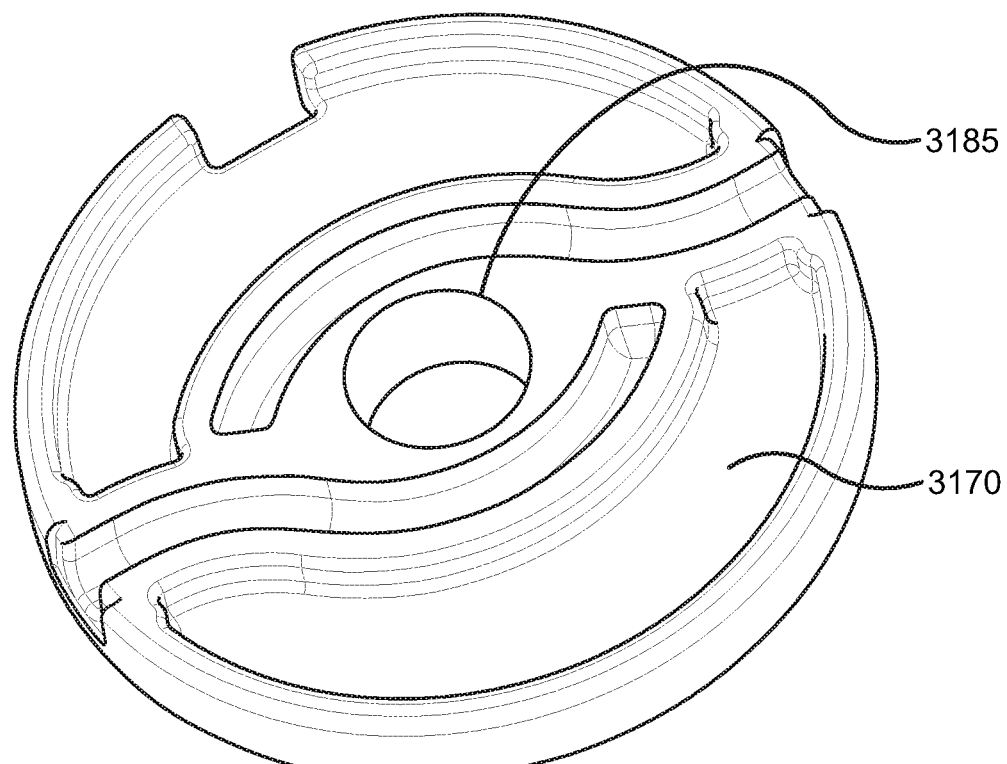
Figure 31D:
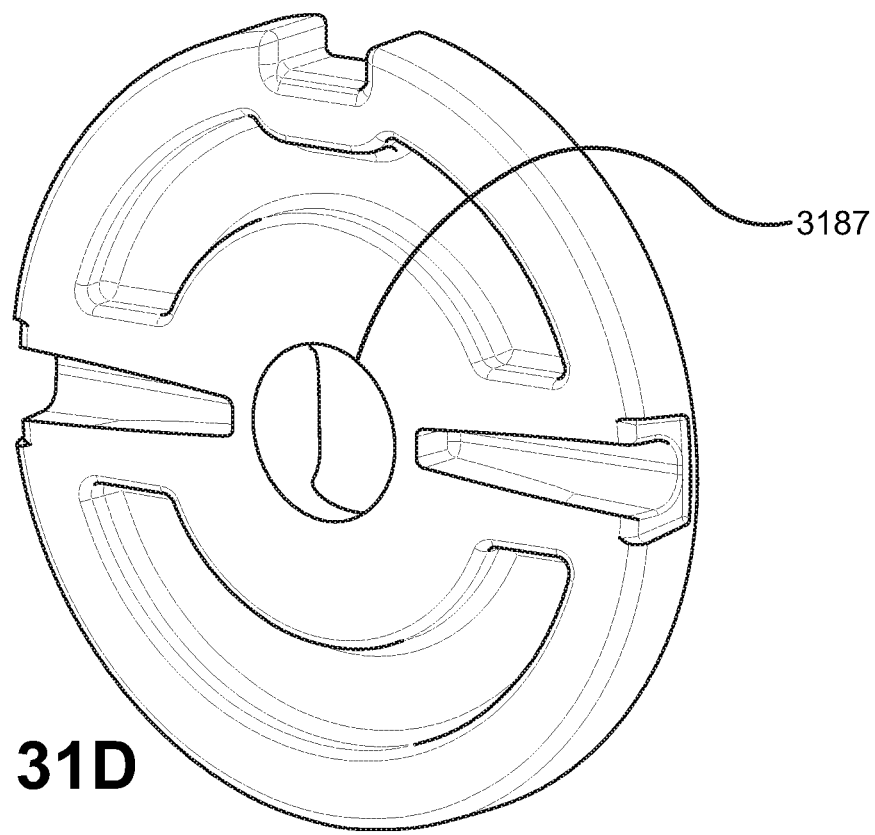

FIG. 31C shows a module for use with the spool of FIG. 30 that is analogous that shown in FIG. 31B. However, the module 3170 of FIG. 31C has a central hole 3187 for receiving a fastener or the chuck or arbor of the drive shaft of a trimmer machine. This use of the module allows for the conversion of the spool from use with a short drive shaft trimmer to a long drive shaft trimmer, the typical difference between a curved drive shaft and a straight drive shaft. FIG. 31D shows the module of FIG. 31B but having a through hole 3187 through the center of the module.

Figure 32A:
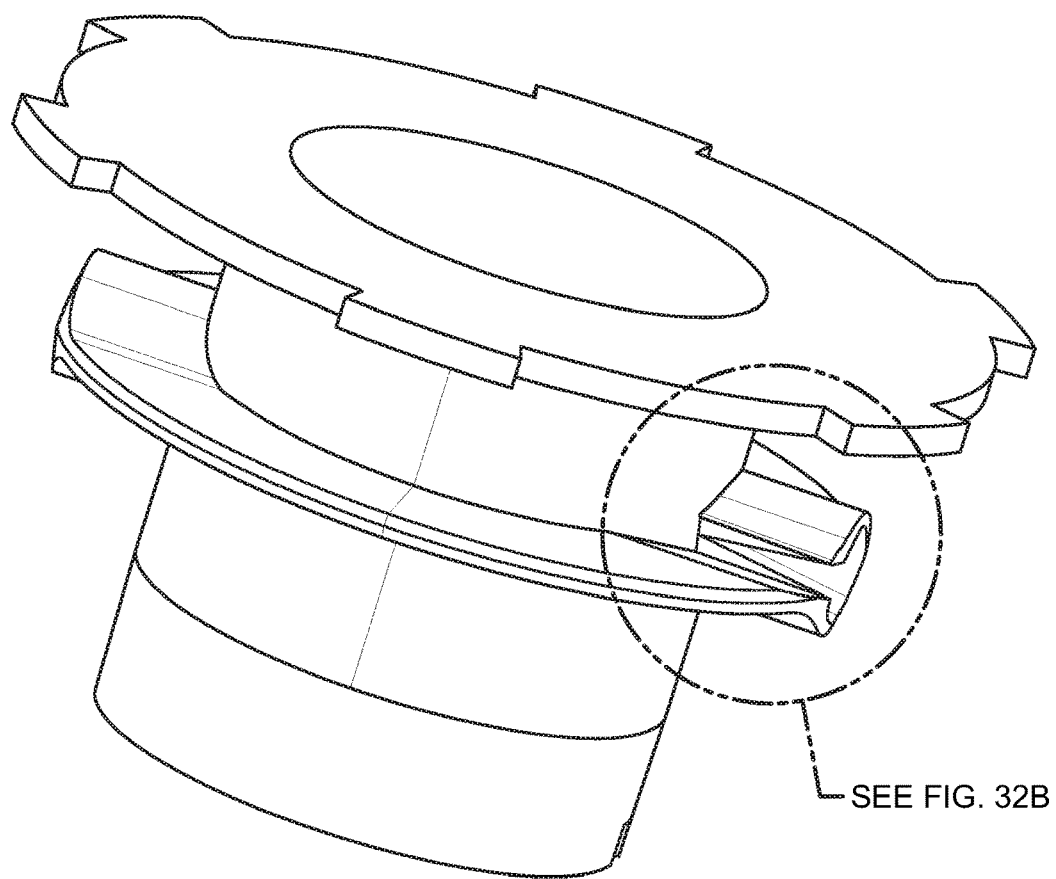
FIGS. 32A & 32B shows a variation on the slot in the central flange or central spoke of the spool for facilitating winding of the line onto the spool.
Figure 32B:
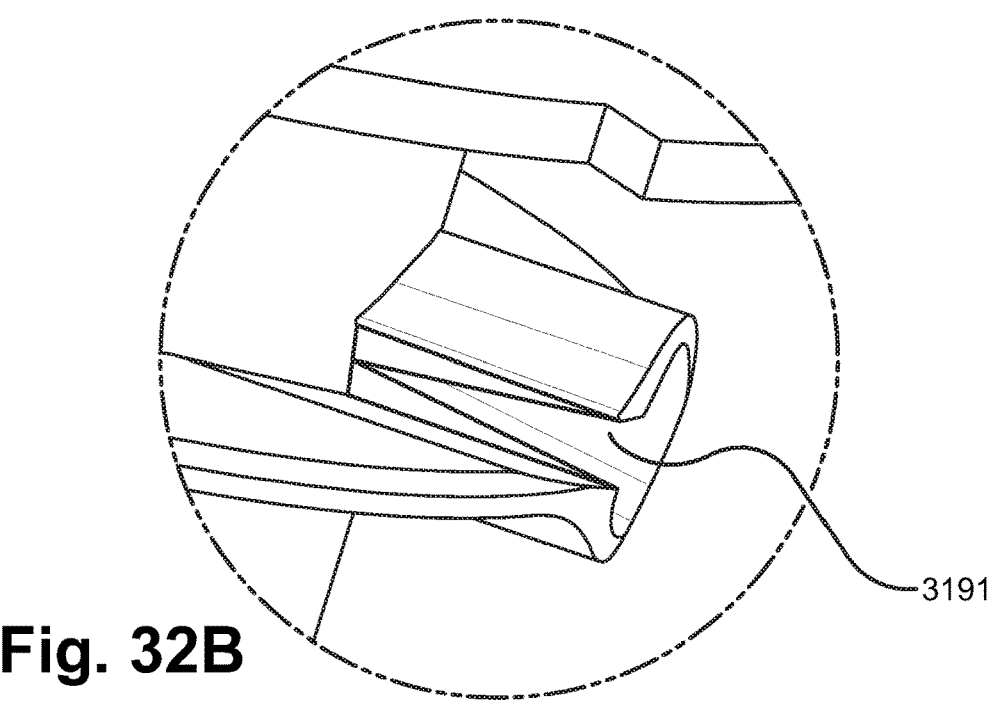

FIGS. 32A & 32B shows a variation on the slot in the central flange or central spoke of the spool for facilitating winding of the line onto the spool. FIGS. 3 & 8 show typically slots for directing the trimmer line into the line holding chambers. The slot opening is roughly equal in diameter at the core of the spool and at a point farthest from the core so that the slot does not interfere with the trimmer line threading onto the core. This also allows for easy removal of the line from the core when the line needs to be replaced. However, when winding the trimmer line onto the spool, the lack of any anchor (such as the interference fit line receiving slots) means that as you begin to wind the trimmer line onto the spool, the line can slip in one direction or the other through the spool, resulting in one end of the trimmer line extending further out of the spool than the other end. This is important during winding and because the longer trimmer line side will immediately need to be trimmed to balance out the two sides of the line. This is typically done automatically by a cutter on the trimmer head. Alternatively, if the lines are wrapped in unequal numbers around the trimmer head, then one side will "finish" before the other and the line will have to be replaced prematurely.

Figure 33:
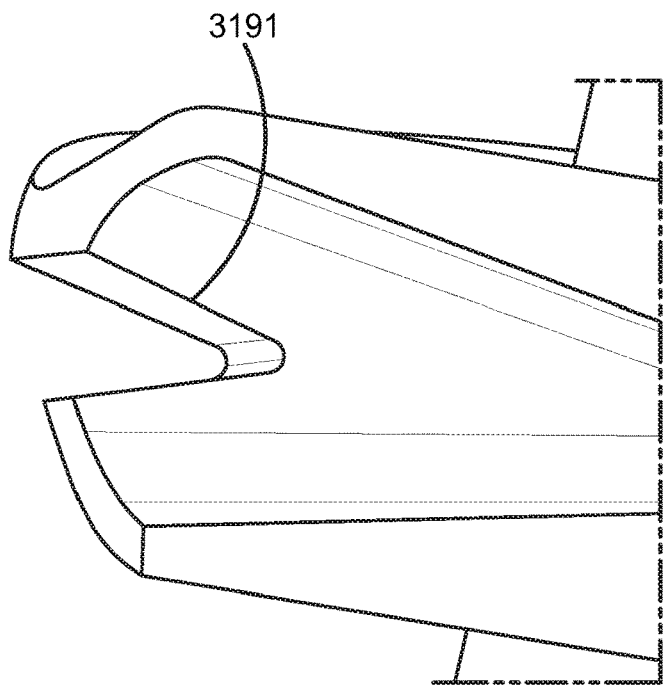
FIG. 33 is a magnified view a slot analogous to that shown in FIG. 32B with a smaller taper.
Figure 39:
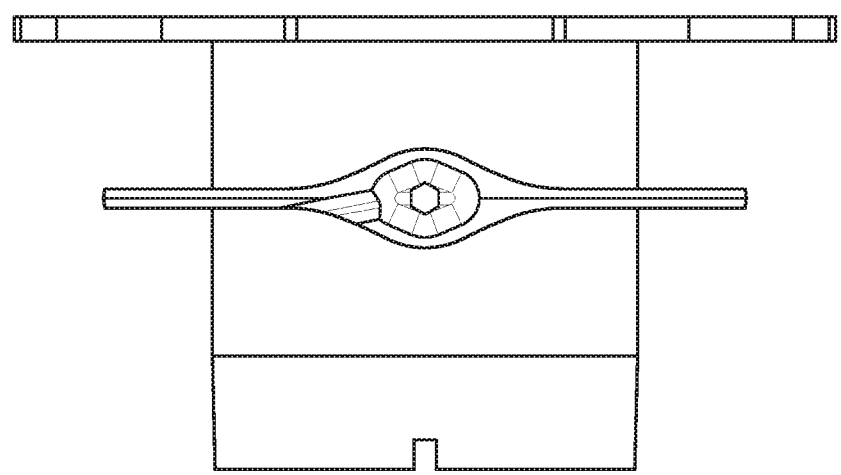
FIG. 39 shows a front plan view of a spool having a slot as shown in FIG. 33.

The embodiment of FIG. 32A solves this issue by providing an anchor for the trimmer line in the form of a V shaped or U shaped slot (or other shape) forming a tapered slot for trapping the line therein. As the trimmer line (not shown) begins its initial wrap around the spool, the line will be forced inwardly along the slot towards the core of the spool. As soon as the diameter/width of the slot 3191 becomes smaller than the diameter of the trimmer line, the line will be anchored in place. With the line thus anchored, the line cannot pull in or out of the spool thereby preventing an imbalance in the trimmer line from one side of the spool to the other. When used with a line receiving slot such as that shown in FIG. 31A, the slot provides an additional anchor to further secure the line onto the spool. When the line needs to be replenished, the line can just be pulled outwardly (through the eyelet for example) to release the line from the slot. The dimension and material of the slot should be chosen carefully to prevent the line from weakening or breaking the line prematurely. FIG. 33 shows a cross section of one such configuration of the slot of the spool of FIGS. 34 & 39. Note that in this embodiment, the slot does not taper to a point, but has a minimum width at the end closer to the spool that will ensure that the trimmer line is not pinched, severed or sliced through. One skilled in the art would also recognize that different slot sizes could be provided depending on the trimmer line diameter being used with the spool. Preferably the minimum width of the taper is more than ½ or ¾ the width of the trimmer line that is installed on the spool to prevent undue pinching of the trimmer line by the anchor taper walls.

LX65

FIGS. 35-38 show an embodiment of a spool for a trimmer head having an extended funnel 3762 for facilitating the entrance of a trimmer line segment (not shown) into the spool channel 3724. Trimmer line is typically made of nylon or similar plastic materials. The material has elastic properties and can be straightened or wound around the spool of a trimmer head. It also is used because it has good wear characteristics. But in the short term, the line can take on a "set" from the shape the material has been stored in. For example, if the line is wound around a wide core (i.e., around a large diameter object), the end of the line may have a gentle curve to it. If the line is wound around a nail or small diameter object, the end of the line may have a sharp curve to it. Either of these may inhibit the line from easily threading into the channel 3724 of a spool.

Previous spools such as that shown in the U.S. Pat. No. 6,263,580 to stark have used an introductory funnel (reference numeral 8, FIG. 3b) to introduce a trimmer line to a spool. However, the funnel does not direct the line into the channel so much as it prevents the line from wandering too far from the channel as the user continues to try to poke the line towards the central hole. If the bend ("hook") of the line is more severe than the angle of introduction of the funnel, then the line will not point towards the channel, but will point towards the opposite side of the funnel. It would be necessary to bend the extended length of the line somewhat so that the tip of the line points into the channel. The short funnel of Stark only helps if end of the line is fairly straight so that the angle of the bend of the line plus the angle of the funnel is not so great that the line points to the opposite funnel wall instead of the entrance to the passageway through the spool. Additionally, the sharp angle of the funnel wall to the passageway can actually introduce additional bend in the line making it harder to insert the line into the passageway.

Figure 36:
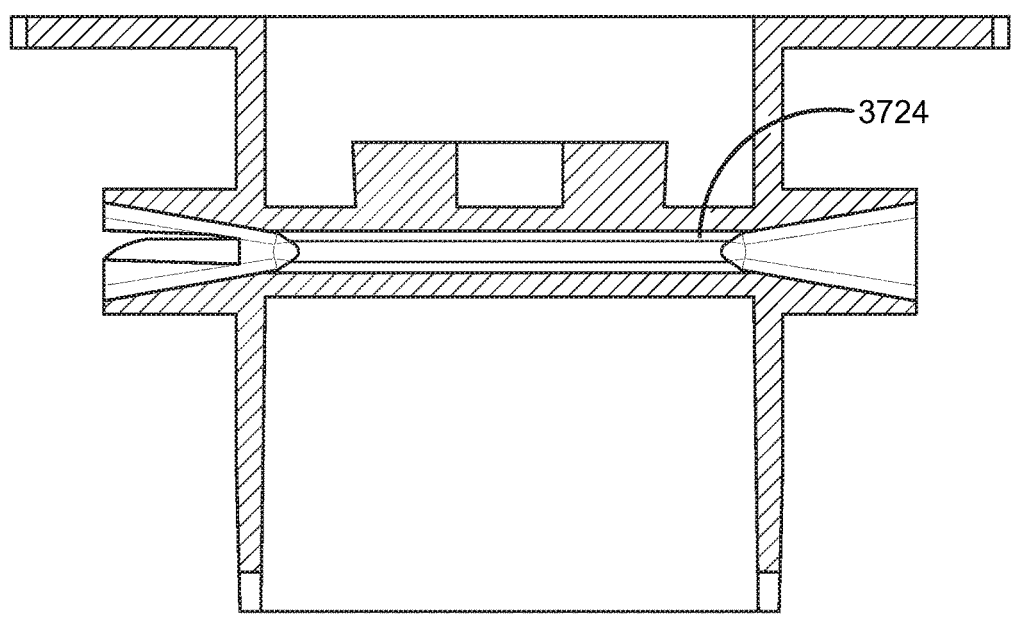
Figure 37:
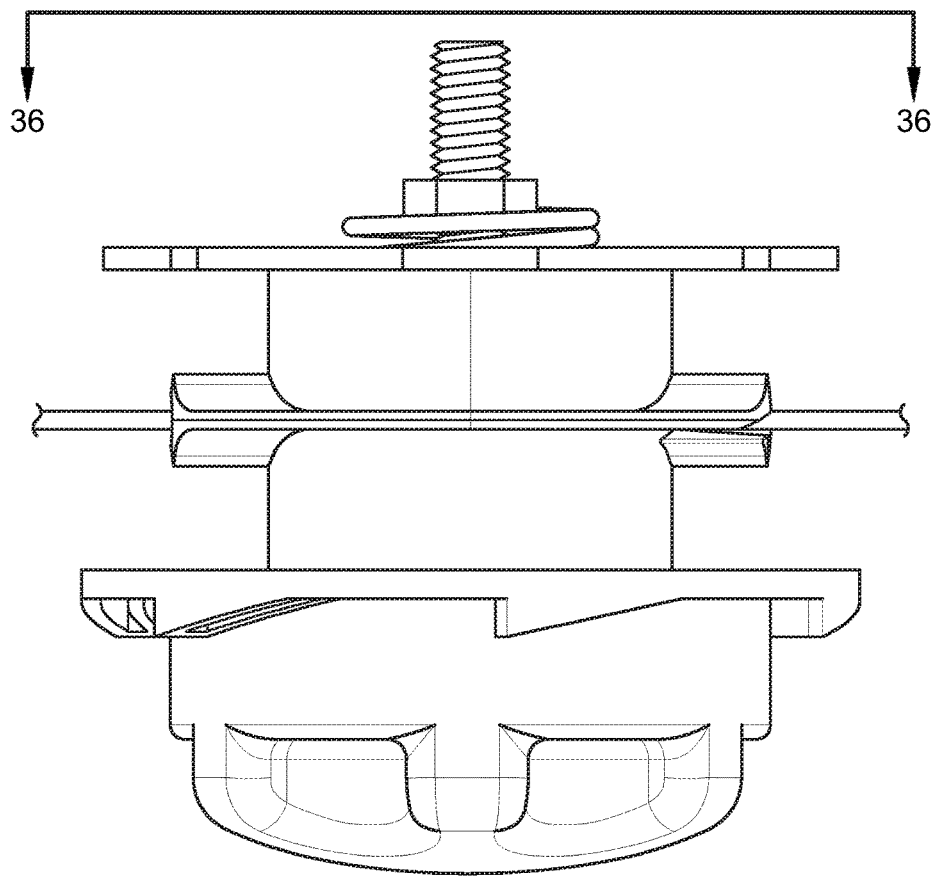
Figure 38:
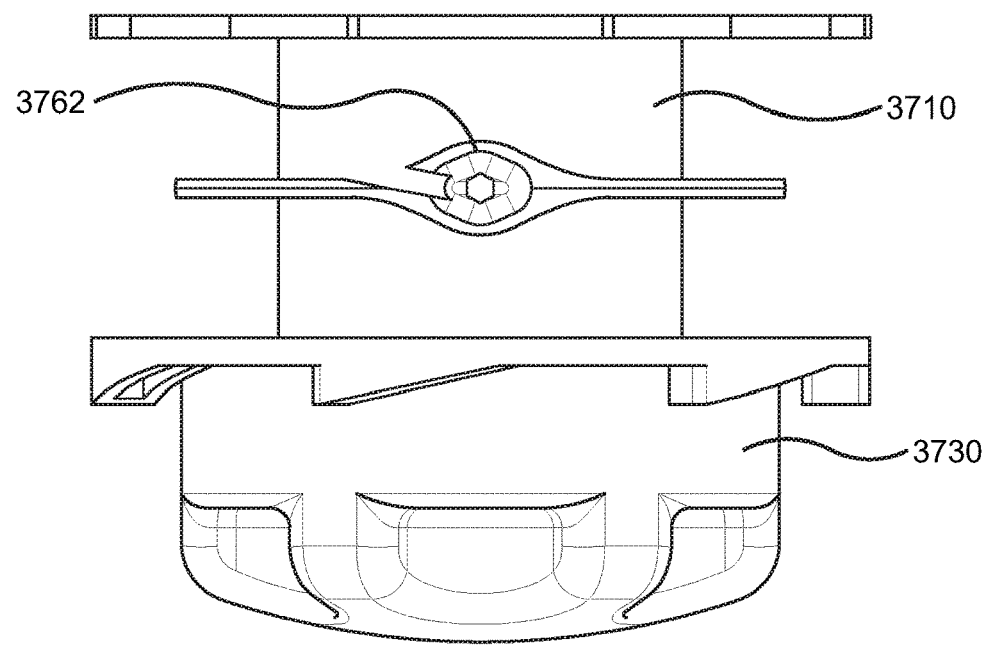

By introducing an elongated funnel having gradually tapering funnel walls, the trimmer line is more likely to be directed into the passageway 3724 of the spool. Additionally, the funnel mouth can be widened to accept the end of the line more easily, while still effectively directing the end of the line into the passageway. Or if the line gets caught as it is entering the funnel because the line is too bent, further pressure on the line is more likely to push the line into the passageway because of the gradual taper of the funnel to the passageway. By making the funnel longer than any anticipated problematic bend in the line, the funnel is more likely to rapidly introduce the trimmer line into the passageway. As shown in FIG. 36, a cross-sectional view of the spool of 37, the funnel can extend from the flange (or spoke) to the core or even inside the core of the spool for maximum funneling effect. Preferably the tapered portion of the funnel proceeds more than ⅓ or ½ of the diameter of the flange from the core of the spool to the outer edge of the flange or spoke. More preferably the funnel extends to within the outer wall of the spool core, and most preferably extends to within the inner wall of the core of the spool as shown in FIG. 36 so that it can readily receive a trimmer line that is not perfectly straight.

Figure 34:
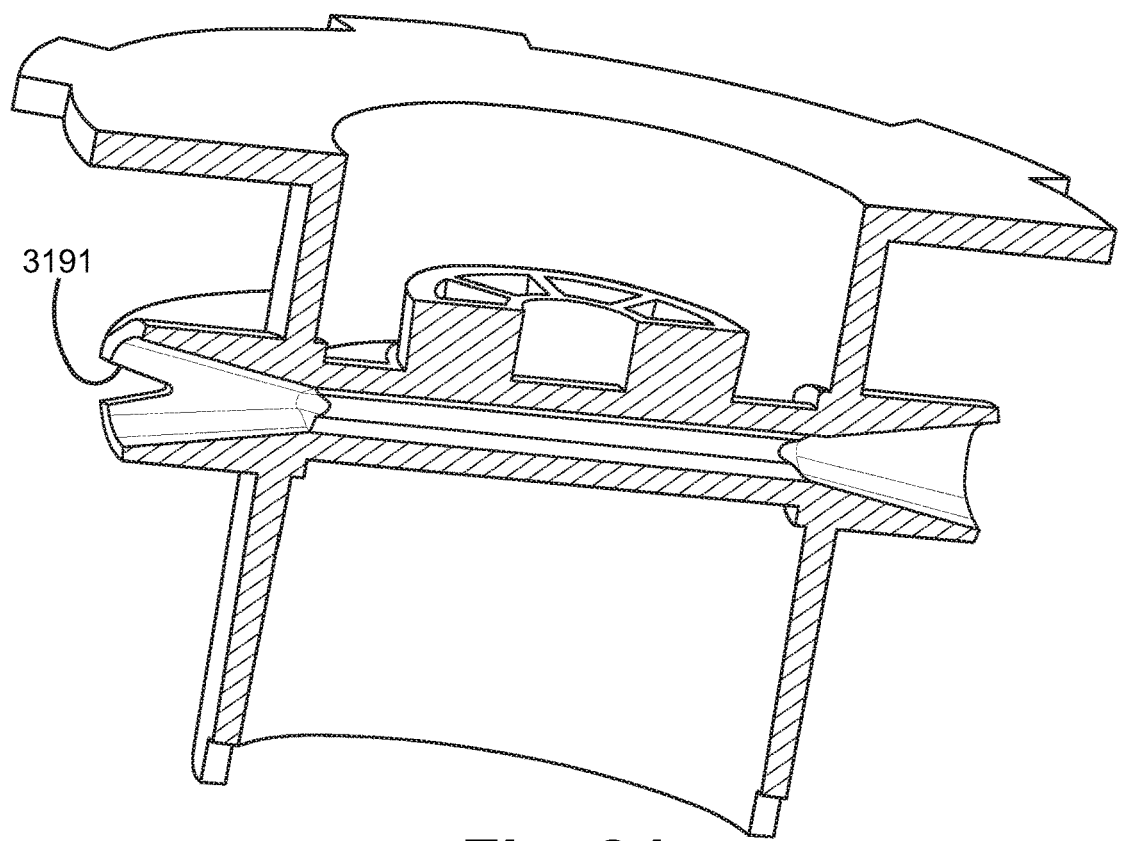
FIG. 34 shows a cross-sectional view of a spool with the slot of FIG. 33.
Figure 35:
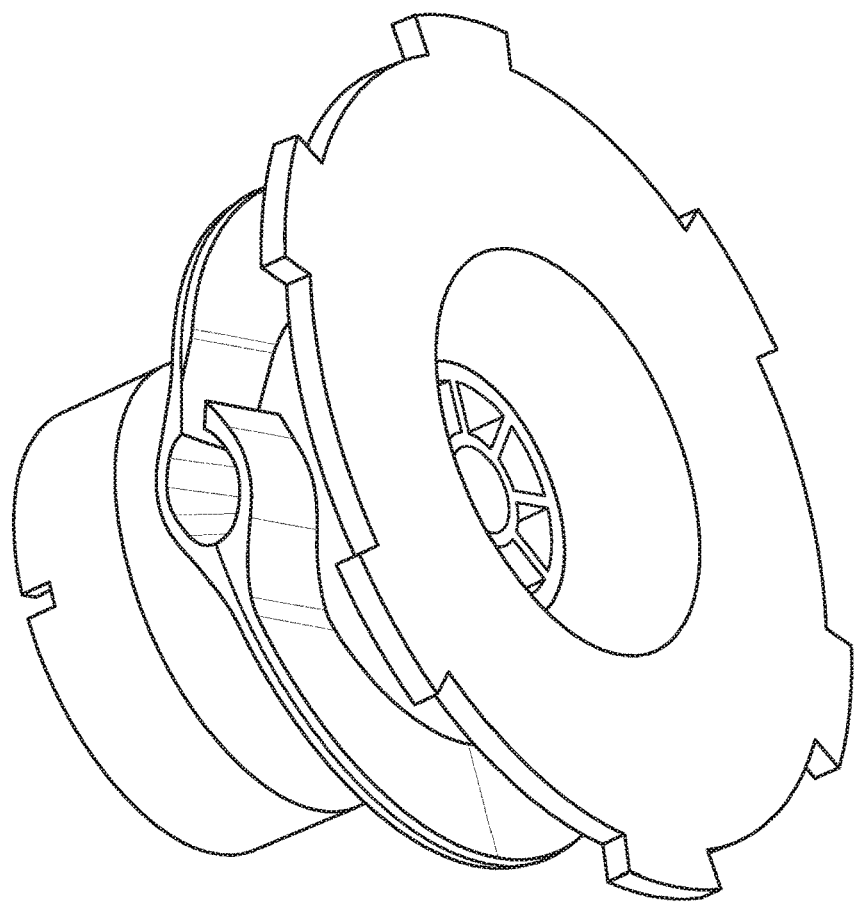
FIG. 35 shows a front plan view of a spool having a slot as shown in FIG. 33.

FIG. 34 shows the combination of the extended funnel and the anchor slot 3191 for anchoring the line as it is wrapped about the spool. Please note that spool 3730 and spool 3710 may be formed as one piece or separate pieces. However, because of the pressure of the line winding in the space provide between the flange of the spool and the top of the knob, it may be necessary when the knob and spool are separate pieces to secure the knob to the spool by a screw, bolt or other fastener. Preferably, the knob and spool are held together by a quick release fastener (not shown) analogous to the ones (reference 25,27 in FIG. 4) used to hold together the trimmer head housing in some embodiments.

It should also be noted that the flange housing the funnel in FIG. 34 has been reduced in diameter compared to the top flange. This allows for a higher capacity in the storage area and more importantly facilitates the efficient dispensing of the line from the funnel to the line holding areas. Additionally, when the funnels include a line anchor 3191, the smaller diameter allows for more room to pull the line out of the slot and through the eyelet when the line is no longer wrapped about the spool and the line is feeding directly from the anchor to the eyelet.

While this invention has been described as having a preferred design, it is understood that it is capable of further modifications, uses and/or adaptations of the invention following in general the principle of the invention and including such departures from the present disclosure as come within the known or customary practice in the art to which the invention pertains and as maybe applied to the central features hereinbefore set forth, and fall within the scope of the invention and the limits of the appended claims. It is therefore to be understood that the present invention is not limited to the sole embodiment described above, but encompasses any and all embodiments within the scope of the following claims.

What is claimed:

1. A spool for a trimmer head of a vegetation trimmer machine comprising:
   a central core;
   an upper flange extending radially outwardly from a wall of the central core;
   a lower flange extending radially outwardly from the wall of the central core; and wherein the spool includes only the upper flange and the lower flange;
   a storage space for trimmer line defined between the upper flange and the lower flange;
   an unobstructed trimmer line guide channel wholly located-in the upper flange, wherein the trimmer line guide channel extends from a first side of the spool to a generally opposing second side of the spool and is of a substantially constant diameter;
   wherein the trimmer line guide channel is coplanar with the upper flange and has a first opening and a second opening that are adapted for direct alignment to eyelet openings in a housing of the trimmer head.

2. The spool as defined in claim 1, wherein the first and second openings of the trimmer line guide channel form a funnel or are flare shaped and extend from an outer edge of the upper flange to the wall of the central core.

3. The spool as defined in claim 1, wherein the trimmer line guide channel is radial.

4. The spool as defined in claim 1, wherein the trimmer line guide channel is non-radial and does not pass through a center axis of rotation of the spool.

5. The spool as defined in claim 1, wherein the lower flange provides a bottom surface of the spool, and wherein the bottom surface comprises engaging receptors under the central core for engaging projections extending from a bump element.

6. The spool as defined in claim 1, wherein the upper flange provides an upper surface of the spool, and wherein the upper surface comprises engaging receptors above the central core for engaging projections extending from the trimmer head.

7. The spool as defined in claim 1, further comprising a removable module engageable within a top surface of the central core, wherein the removable module comprises a feed channel aligned with the guide channel in the upper flange.

8. The spool as defined in claim 7, further comprising one or more walls extending from a top surface of the central core and at least partially defining a central cavity at a top surface of the spool, wherein the removable module is engageable within the central cavity of the spool.

9. The spool as defined in claim 7, further comprising at least two teeth protruding from a top edge of the one or more walls and configured to interact with two or more stop bars in a trimmer head housing to provide trimmer line feed control.

10. A spool for use with a string trimmer head, said spool having a central core around a central axis and at least one flange extending from an end of the central core, said central core and the at least one flange defining at least one chamber for winding trimmer line threaded through said spool and around the central core;
wherein the at least one flange includes a first flange that defines a first passage and a second passage therein, wherein said first passage extends from the central core and through the first flange to a first side of the spool and said second passage extends from the central core and through the first flange to a second side of the spool; and
a replaceable module removably engaged within said central cavity of the spool, wherein said module includes a first section having a passageway section defining a passageway therein that connects the first and second passages of the flange for routing said trimmer line through said first and second passages when the module is in the spool and the first passageway section is aligned with said first and second passages.

11. The spool as defined in claim 10, wherein the passageway of the replaceable module passes through a central axis of the central core and is coplaner with the first flange.

12. The spool as defined in claim 10, wherein the first flange is an upper flange of the spool.

13. The spool as defined in claim 10, further comprising one or more walls extending from a top surface of the central core and at least partially defining a central cavity at a top surface of the spool, wherein the removable module is engageable within the central cavity of the spool.

14. The spool as defined in claim 13, further comprising at least two teeth protruding from a top edge of the one or more walls and configured to interact with two or more stop bars in a trimmer head housing to provide trimmer line feed control.

15. A trimmer head for mounting to a trimmer machine, the trimmer head comprising:
a trimmer head housing;
a spool mounted to rotate about a central axis of rotation within the trimmer head housing, said spool comprising:
a cylindrical core about the central axis;
a top flange defining a top surface and a bottom flange defining a bottom surface,
at least one chamber defined between the top flange and the bottom flange for winding trimmer line threaded through said spool and around the core of the spool, and
one or more walls extending from the top surface of the top flange of the spool and at least partially defining a central cavity at the top surface of the spool;
a removable module engageable within the central cavity;
a trimmer line feed channel defined at least partially in the top flange and at least partially in the removable module for routing trimmer line through the spool;
said trimmer head housing having a pair of eyelets for receiving ends of the trimmer line therethrough from said feed channel to an area outside the trimmer head housing;
an activation bump knob slidably connected to said trimmer head housing for moving said spool from a first axial position relative to said trimmer head housing to a second axial position relative to said trimmer head housing;
at least two teeth protruding from a top edge of the one or more walls extending from the top flange and configured to interact with two or more stop bars in the trimmer head housing to provide trimmer line feed control;
said trimmer head housing having a ratchet mechanism comprised of at least four ramps in a bottom portion of the trimmer head housing and at least four ramps on the bump knob that moveably engage the at least four ramps in the bottom portion of the trimmer head housing, wherein the ramps of the bump knob are moveable between a winding mode and a trimmer line dispensing mode such that when the spool is in the first axial position, the trimmer line is windable onto the spool in a winding direction and the ratchet mechanism prevents the spool from rotating in a direction opposite to the winding direction, and when the spool is in the second axial position, the ratchet mechanism permits the spool to rotate in a clockwise direction or a counterclockwise direction and a length of trimmer line is dispensed out through the pair of eyelets.

16. The trimmer head of claim 15, wherein the feed channel in the removable module is straight and intersects the axis of rotation of the spool.

17. The trimmer head of claim 16, wherein the straight feed channel is radial.

18. The trimmer head of claim 16, wherein the straight feed channel does not pass through a center axis of rotation of the spool.

19. The trimmer head of claim 15, wherein the feed channel in the removable module is curved.

20. The trimmer head of claim 19, wherein the curved feed channel does not pass through a center axis of rotation of the spool.

21. The trimmer head of claim 15, wherein the at least two teeth protruding from the top surface of the top flange of the spool protrude from atop the one or more walls extending from the top surface of the spool.

22. The trimmer head of claim 15, wherein first and second openings of the feed channel form a funnel or are flare-shaped.

23. The trimmer head of claim 15, wherein the first and second openings extend from the core to an outer edge of the top flange.

\* \* \* \* \*